(12) United States Patent
Motomura

(10) Patent No.: US 8,814,705 B2
(45) Date of Patent: Aug. 26, 2014

(54) GAME CONTROL DEVICE AND STORAGE MEDIUM INCLUDING CREATING AND ARRANGING A CHARACTER

(71) Applicant: GREE, Inc., Minato-ku (JP)

(72) Inventor: Atsushi Motomura, Tokyo (JP)

(73) Assignee: GREE, Inc., Minato-ku (JP)

( * ) Notice: Subject to any disclaimer, the term of this patent is extended or adjusted under 35 U.S.C. 154(b) by 0 days.

(21) Appl. No.: 14/106,130

(22) Filed: Dec. 13, 2013

(65) Prior Publication Data
US 2014/0100042 A1    Apr. 10, 2014

Related U.S. Application Data

(63) Continuation of application No. PCT/JP2013/071155, filed on Aug. 5, 2013.

(30) Foreign Application Priority Data

Aug. 6, 2012   (JP) ................ 2012-174012
Mar. 27, 2013  (JP) ................ 2013-066031

(51) Int. Cl.
```
A63F 9/24      (2006.01)
A63F 13/00     (2014.01)
G06F 17/00     (2006.01)
G06F 19/00     (2011.01)
```
(52) U.S. Cl.
USPC ............................................. 463/42; 463/43

(58) Field of Classification Search
USPC ...................................... 463/42, 43
See application file for complete search history.

(56) References Cited

U.S. PATENT DOCUMENTS

| | | | |
|---|---|---|---|
| 5,966,526 | A | 10/1999 | Yokoi |
| 2002/0096831 | A1 | 7/2002 | Nakayama et al. |
| 2005/0148390 | A1 | 7/2005 | Murase et al. |
| 2009/0029779 | A1 | 1/2009 | Murase et al. |

FOREIGN PATENT DOCUMENTS

| | | |
|---|---|---|
| JP | 8-309032 A | 11/1996 |
| JP | 3044116 U | 9/1997 |
| JP | 10-314455 A | 12/1998 |
| JP | 2002-210249 A | 7/2002 |
| JP | 2005-192599 A | 7/2005 |
| JP | 2009-028102 A | 2/2009 |
| JP | 2012-061060 A | 3/2012 |

OTHER PUBLICATIONS

International Search Report issued on Sep. 3, 2013 International Application No. PCT/JP2013/071155.

(Continued)

*Primary Examiner* — William M. Brewster
(74) *Attorney, Agent, or Firm* — Oblon, Spivak, McClelland, Maier & Neustadt, L.L.P.

(57) ABSTRACT

An event starting unit starts an event which associates characters of first and second players. An event managing unit repeatedly executes alternately a first interaction including transmission of first question information to a communication terminal and reception of first answer information from the communication terminal, and a second interaction including transmission of second question information to the communication terminal and reception of second answer information from the communication terminal. A character creating unit creates a new character based on parameters of the characters of the first and second players when the number of times of the first and second interactions reaches a predetermined value. The new character created by the character creating unit is arranged in the first and second virtual spaces.

13 Claims, 19 Drawing Sheets

(56) References Cited

OTHER PUBLICATIONS

International Search Report mailed Sep. 3, 2013 for PCT/JP2013/07115, filed Aug. 5, 2013 with English Translation of Categories.
International Written Opinion mailed Sep. 3, 2013 for PCT/JP2013/071155, filed Aug. 5, 2013.
Japanese Office Action mailed Jun. 18, 2013 for JP 2013-066031, filed Mar. 27, 2013 with English Translation.
"Enjoy Ultra-happy Life! Tamagocchi Plus, Wonderful Raising Guide," KK Kondansha, Feb. 1, 2006, 1st edition, pp. 112.
"Wonder Life Special, Koro-koro Comics, special edition, Game de Hakken!! Tamagocchi, Osucchi and Mesucchi, Perfect Raising Guide," K.K. Shogakukan, Apr. 1, 1998, 1st edition, pp. 41.
"Animal Friends," Monthly application Style, April Issue, K.K. East Press, Feb. 28, 2013, vol. 1, No. 3, pp. 18-19.

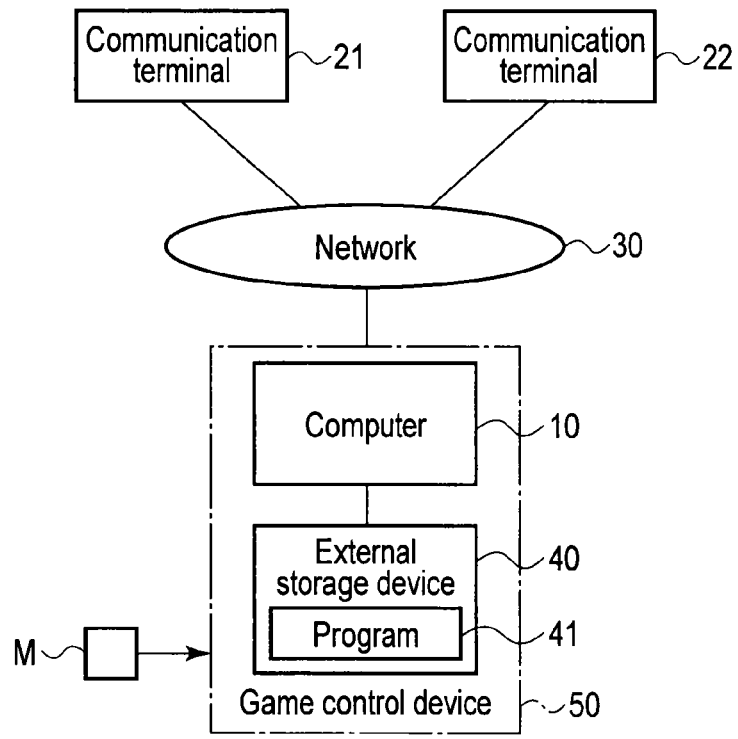
F I G. 1
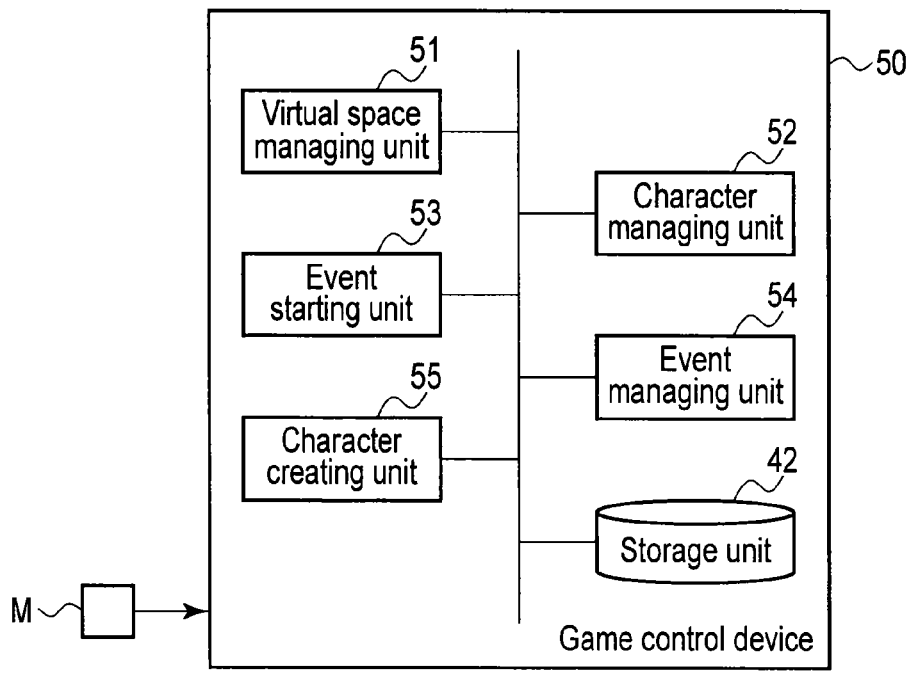
F I G. 2

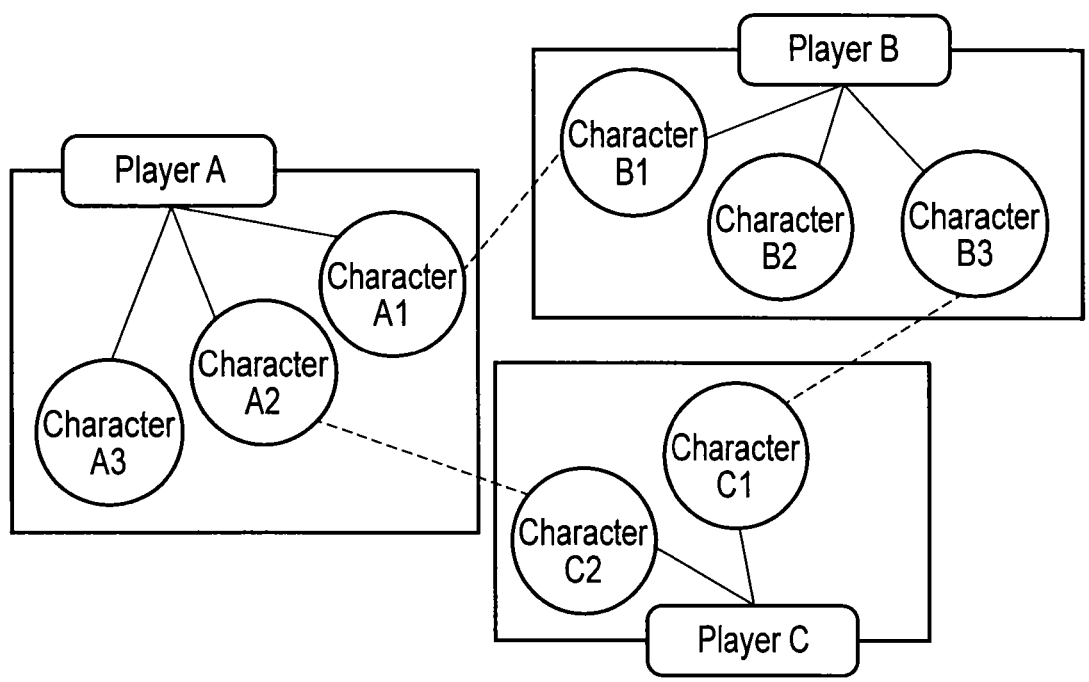
F I G. 3

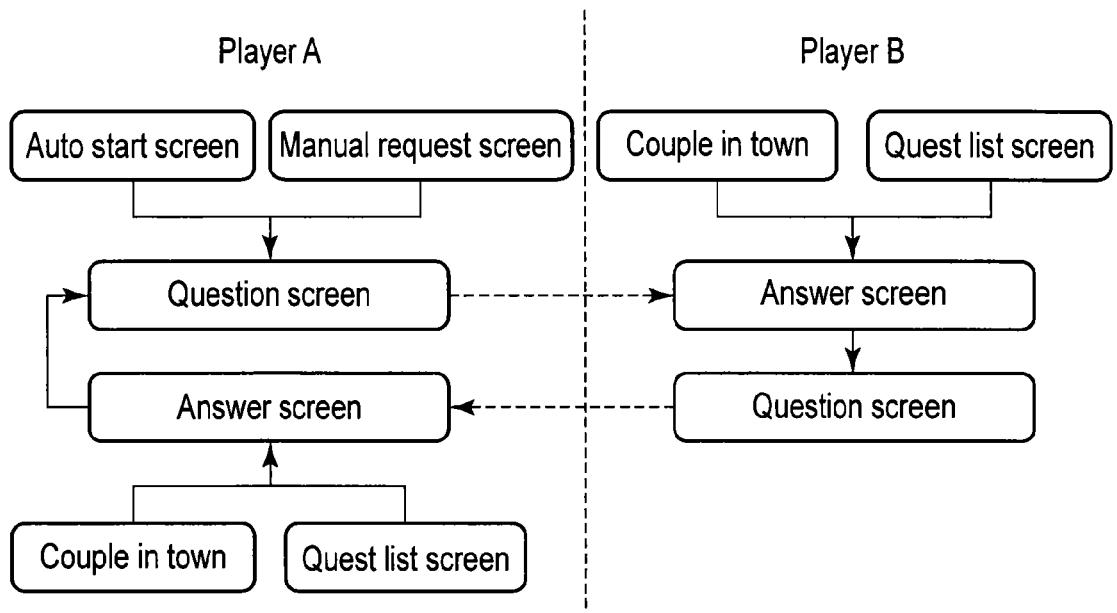
F I G. 5
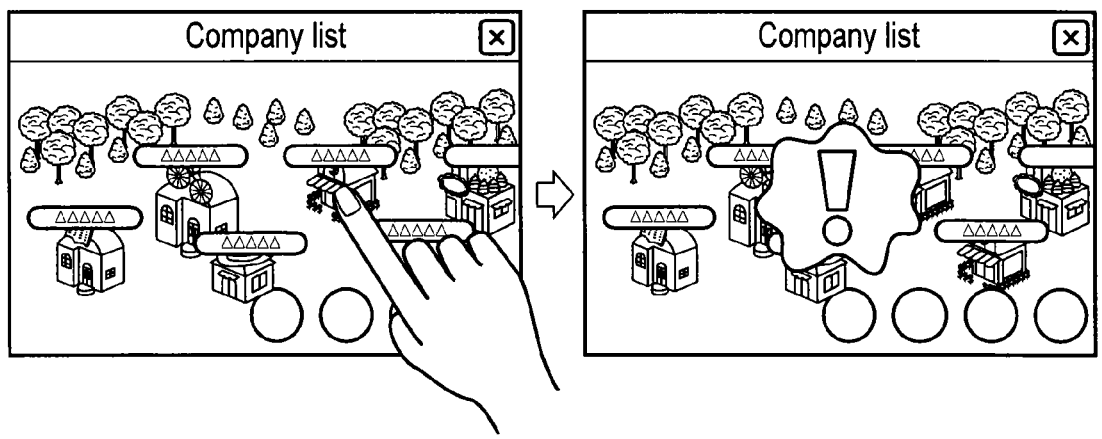
F I G. 6

F I G. 13
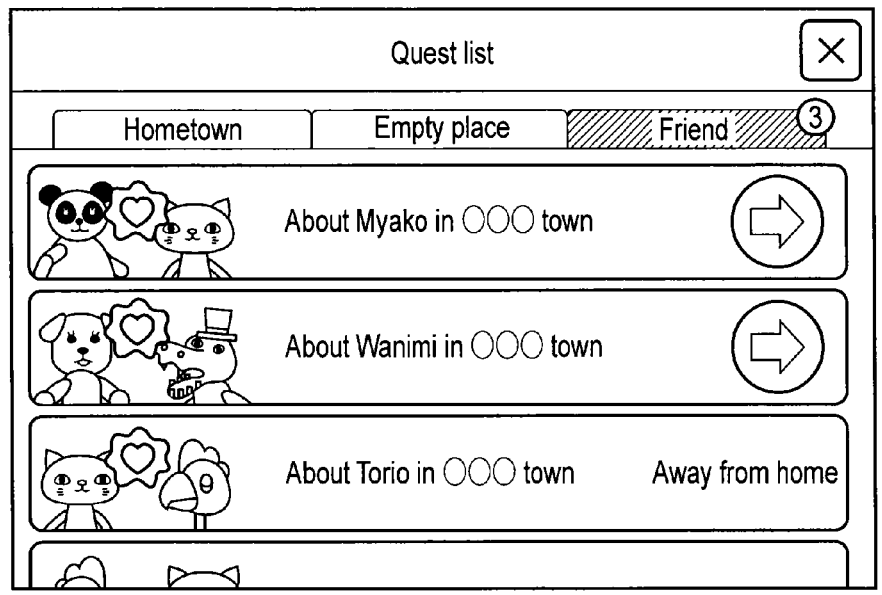
F I G. 14

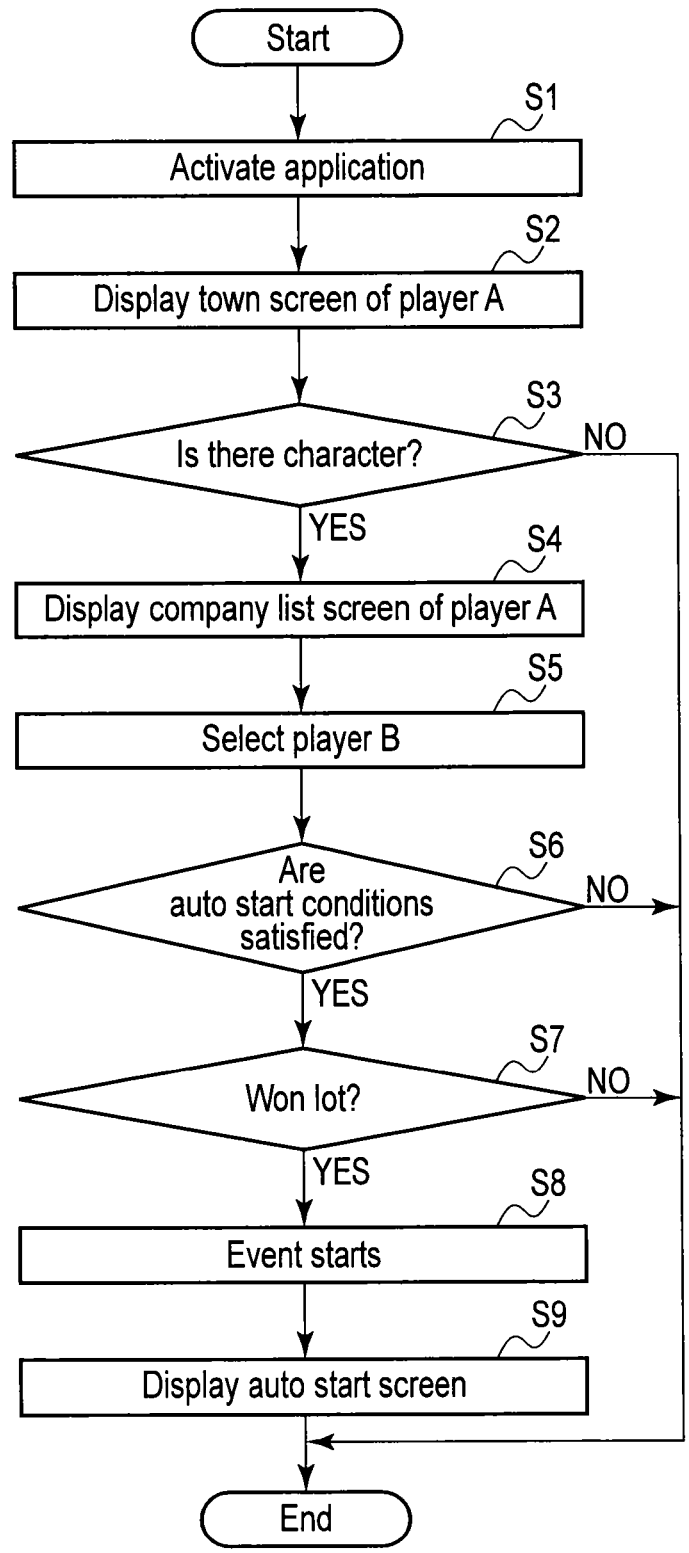
F I G. 15

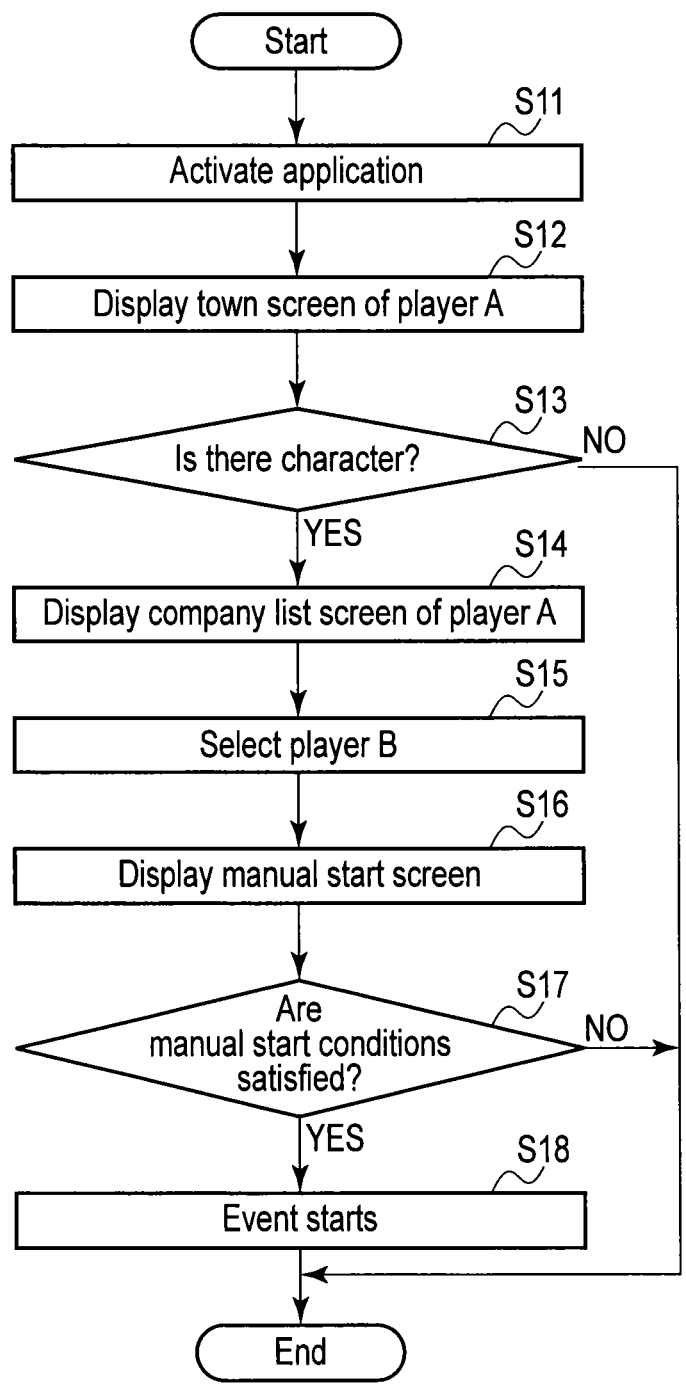
F I G. 16

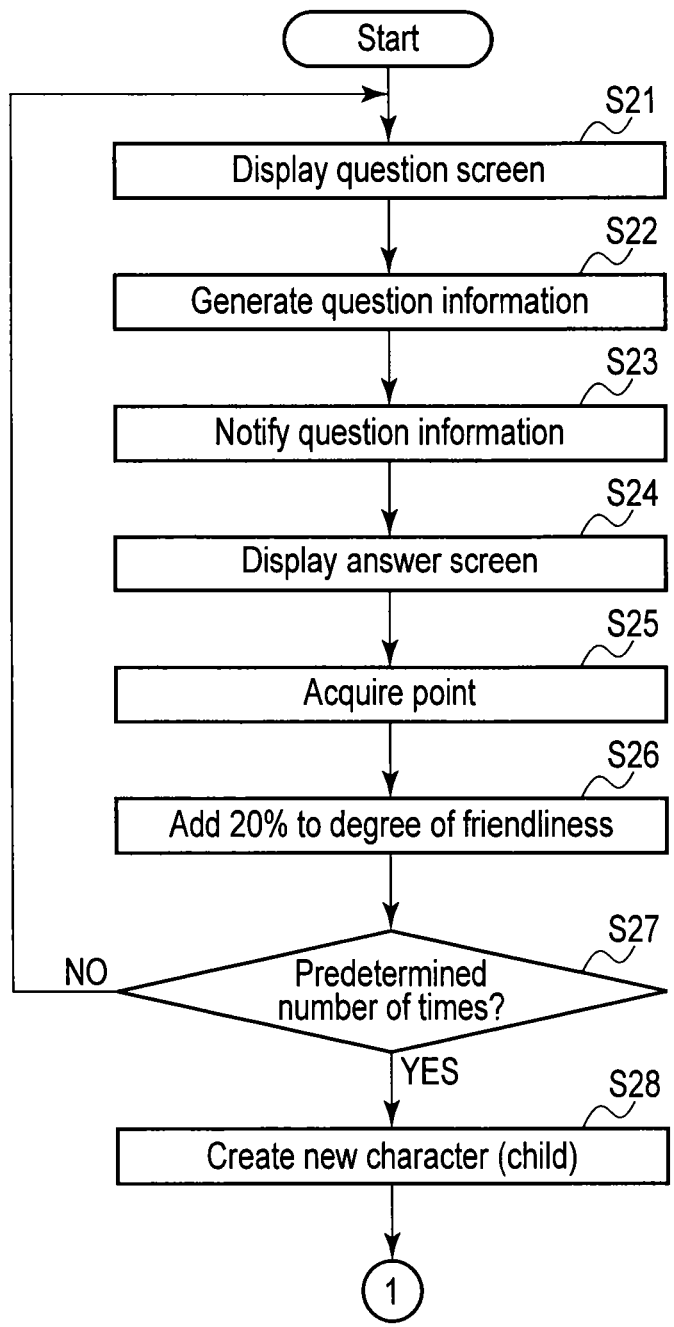
F I G. 17

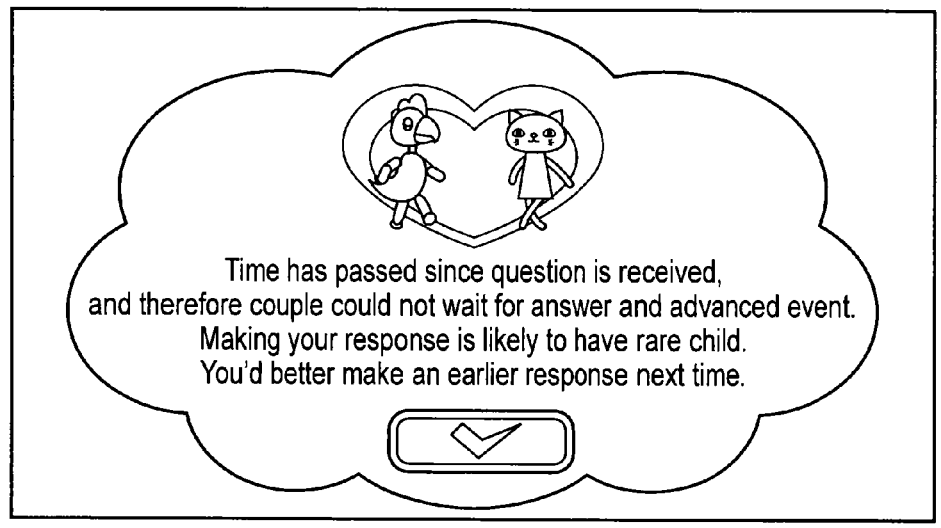
F I G. 22
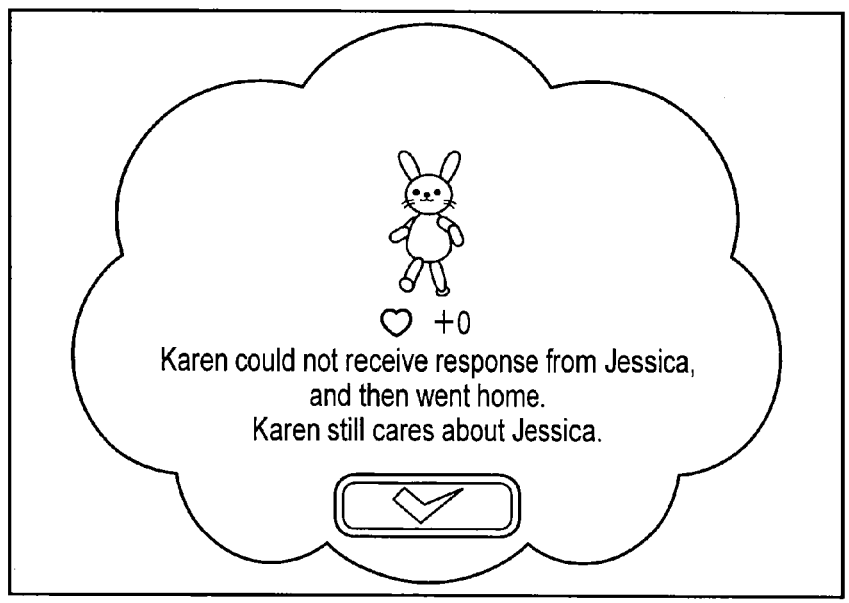
F I G. 23

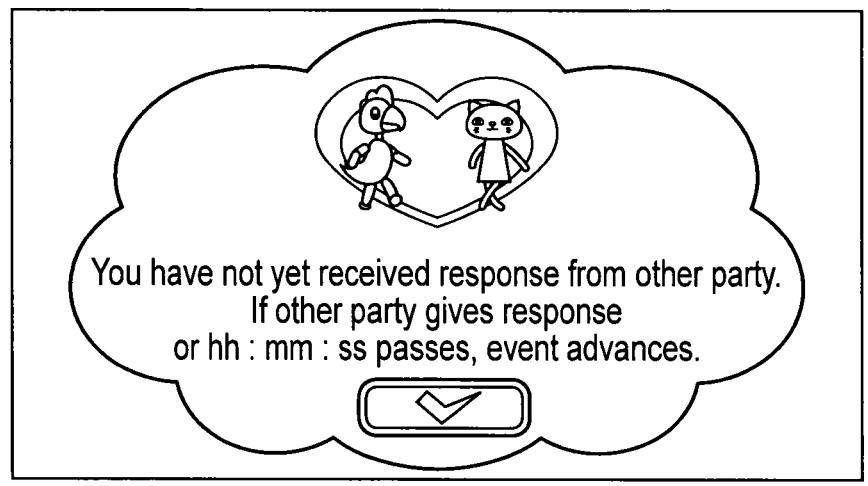
F I G. 26

GAME CONTROL DEVICE AND STORAGE MEDIUM INCLUDING CREATING AND ARRANGING A CHARACTER

CROSS-REFERENCE TO RELATED APPLICATIONS

This application is based upon and claims the benefit of priority from Japanese Patent Applications No. 2012-174012, filed on Aug. 6, 2012, and No. 2013-66031, filed on Mar. 27, 2013, the entire contents of all of which are incorporated herein by reference.

BACKGROUND OF THE INVENTION

1. Field of the Invention

The present invention relates to a game control device and a storage medium.

2. Description of the Related Art

In recent years, social games which are provided by social networking service (SNS) and are played by communicating with other users are known (for example, see Jpn. Pat. Appln. KOKAI Publication No. 2012-61060).

Application programs for playing these social games are roughly classified into a native application and a web application (web application). The native application is downloaded to a communication terminal, and is installed to the communication terminal and used. The web application operates on a web server, and is used by a web browser of the communication terminal.

More specifically, the native application is an application which depends on an OS of the communication terminal such as an iPhone (registered trademark) terminal and an Android (registered trademark) terminal of smartphones. For example, a server device distributes native applications such as an iPhone application on which Objective-C is implemented or an Android application on which Java (registered trademark) is implemented from a platform to each communication terminal.

In addition, the native application needs to be developed using two types of programming language; "Objective-C", which supports iPhone terminals, and a programming language "Java", which supports Android terminals. Hence, the native application needs to be subjected to coding processing using a language unique to a platform of a communication terminal and released through an official marketplace.

Meanwhile, a web application can be developed by way of cross-development based on languages such as HTML 5 (Hyper Text Markup Language 5), Javascript (registered trademark) and CSS3 (Cascading Style Sheets 3) for both platforms, and do not need to be released through the official marketplace. Further, the web application does not depend on an OS of a terminal.

In some social games, a player creates a character such as an animal, and creates a virtual space such as a town in which the character exists.

However, for example, one feature of some games allows players to create characters in a free manner, which can cause players to lose interest or motivation due to lack of amusement or sense of achievement.

BRIEF SUMMARY OF THE INVENTION

An object of the present invention is to provide a game control device and a storage medium which allow a plurality of players to collaborate and create characters and increase amusement.

According to one aspect of the present invention, a game control device which is connected to and can perform communication with first and second communication terminals used by first and second players, and which provides to the first communication terminal a first virtual space in which a character of the first player exists and provides to the second communication terminal a second virtual space in which a character of the second player exists, is provided. This game control device has: a storage unit which stores a parameter of the character of the first player and a parameter of the character of the second player; an event starting unit which starts an event which associates the character of the first player and the character of the second player; a first transmitting unit which, when the event is started, transmits first question information related to the first virtual space, to the second communication terminal; a first receiving unit which receives first answer information to the first question information, from the second communication terminal; a second transmitting unit which, when the first answer information is received, transmits second question information related to the second virtual space, to the first communication terminal; a second receiving unit which receives second answer information to the second question information, from the first communication terminal; an event managing unit which repeatedly executes alternately a first interaction including the transmission of the first question information and the reception of the first answer information and a second interaction including the transmission of the second question information and the reception of the second answer information; a character creating unit which, when a number of times of the repeatedly executed first and second interactions reaches a predetermined value, creates a new character based on the parameter of the character of the first player and the parameter of the character of the second player stored in the storage unit; and an arranging unit which arranges the created new character in the first and second virtual spaces. The character creating unit changes a parameter of the new character based on the first answer information received by the first receiving unit and the second answer information received by the second receiving unit.

The present invention can provide a highly amusing game which allows a plurality of players to collaborate and create characters.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating a hardware configuration of a network system which includes a game control device according to a first embodiment of the present invention;

FIG. 2 is a block diagram mainly illustrating a functional configuration of a game control device 50 illustrated in FIG. 1;

FIG. 3 is a view for explaining characters which exist in a virtual space of each player;

FIG. 5 is a view for explaining screens displayed on a communication terminal 21 used by a player A and a communication terminal 22 used by a player B;

FIG. 6 is a view illustrating an example of an auto start screen displayed on the communication terminal 21 used by the player A;

FIG. 13 is a view illustrating an example of a couple screen of a town;

FIG. 14 is a view illustrating an example of a quest list screen;

FIG. 15 is a flowchart illustrating processing of the game control device 50 when an event is automatically started;

FIG. 16 is a flowchart illustrating processing of the game control device 50 when an event is manually started;

FIG. 17 is a flowchart illustrating processing of the game control device 50 when an event is started according to the present embodiment;

FIG. 22 is a view illustrating an example of a screen of the communication terminal 22 which displays that an auto answer is given;

FIG. 23 is a view illustrating an example of the screen of the communication terminal 21 which displays an event advance notice;

FIG. 26 is a view illustrating an example of a screen when the answer encouraging notice is transmitted again if a certain period of time does not pass after the answer encouraging notice is transmitted;

DETAILED DESCRIPTION OF THE INVENTION

Figure 4:
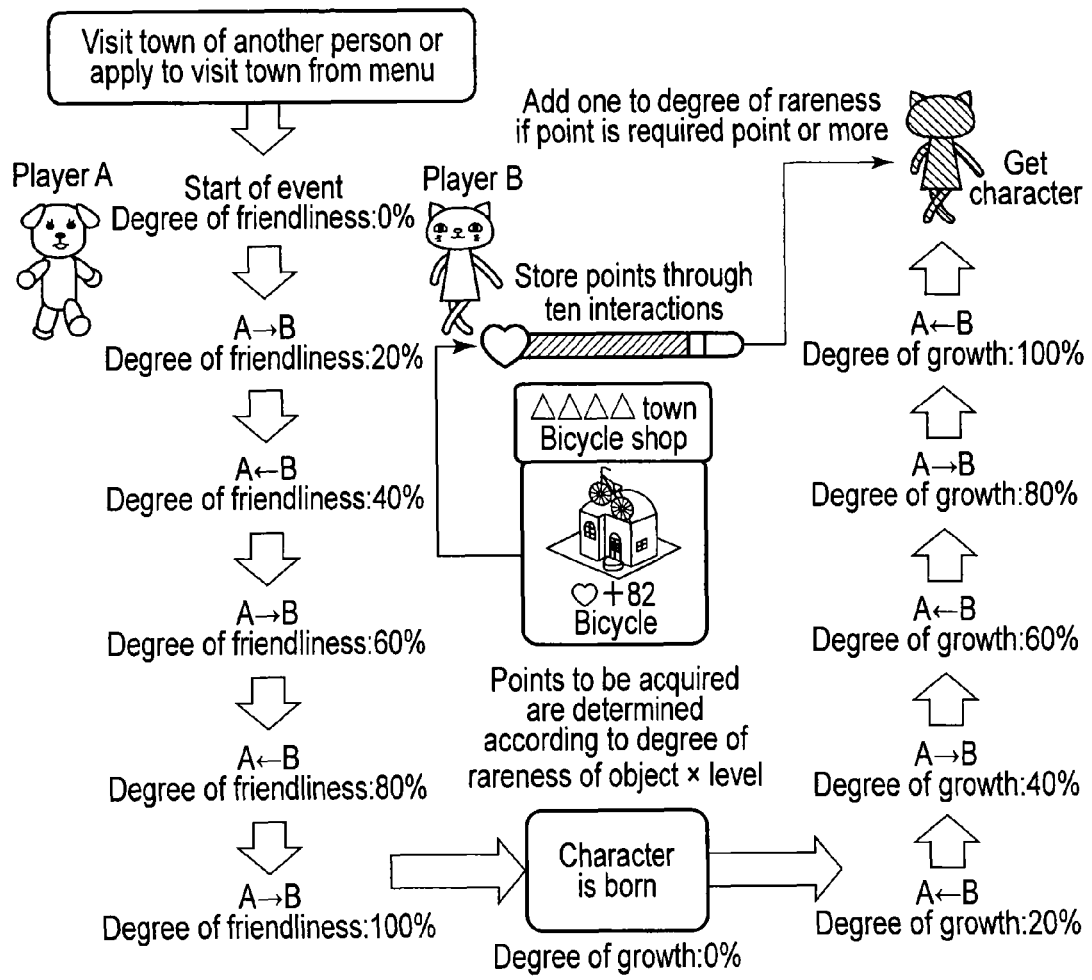
FIG. 4 is a view for conceptually explaining a flow of creating a new character.

Hereinafter, embodiments of the present invention will be described with reference to the drawings. In addition, the following game control device can be achieved by a hardware configuration or a combined configuration of hardware resources and software. The software according to the combined configuration is installed to a computer from a network or a non-transitory computer-readable storage medium M in advance as illustrated in FIGS. 1 and 2 and is executed by the processor of the computer to use a program for causing the computer to realize functions of the game control device.

First Embodiment

FIG. 1 is a block diagram illustrating a hardware configuration of a network system which includes a game control device according to a first embodiment of the present invention.

The network system illustrated in FIG. 1 mainly has a computer (server computer) 10 and a plurality of communication terminals. A plurality of communication terminals include a communication terminal 21 (first communication terminal) and a communication terminal 22 (second communication terminal). The communication terminal 21 is used by, for example, a player A (first player), and the communication terminal 22 is used by, for example, a player B (second player). In addition, communication terminals other than the communication terminals 21 and 22 are omitted in FIG. 1.

A plurality of communication terminals including the communication terminals 21 and 22 are connected to and can perform communication with the computer 10 through the network 30 such as the Internet.

The computer 10 is connected to an external storage device 40 such as a hard disk drive (HDD). This external storage device 40 stores a program 41 which is executed by the computer 10. The computer 10 and the external storage device 40 configure the game control device 50.

In the present embodiment, the game control device 50 has a function of controlling a game (social game) which, for example, provides to the communication terminal 21 a virtual space (first virtual space) in which characters of the player A exist, and provides to the communication terminal 22 a virtual space (second virtual space) in which characters of the player B exist. In addition, an application program for playing this game is downloaded to the communication terminals 21 and 22, and is installed to the communication terminals 21 and 22.

Hereinafter, the virtual space which is provided to the communication terminal 21 and in which the characters of the player A exist is referred to as a virtual space of the player A, and the virtual space which is provided to the communication terminal 22 and in which the characters of the player B exist is referred to as a virtual space of the player B.

The characters of the player A include characters such as animals. Further, in the virtual space of the player A, for example, a virtual town in which the characters of the player A live is formed. Further, in the virtual space of this player A, there is an object such as a building which is created according to (a parameter of) the character of the player A. Furthermore, the player A can create a new character by collaborating with a player (for example, the player B) who is different from the player A.

Under control of the game control device 50 according to the present embodiment, the player A can develop the virtual space (town) of the player A by creating an object and a new character as described above. In addition, the same also applies to the virtual space of the player B.

Further, the player A and the player B can browse (display) the virtual spaces of the player A and the player B themselves and (for example, characters which depend on) virtual spaces of other players through the communication terminals 21 and 22 used by the player A and the player B.

Meanwhile, although the player A and the player B have been mainly described, the same virtual spaces are also provided to (communication terminals used by) other players than the player A and the player B.

FIG. 2 is a block diagram mainly illustrating a functional configuration of the game control device 50 illustrated in FIG. 1. As illustrated in FIG. 2, the game control device 50 includes a virtual space managing unit 51, a character managing unit 52, an event starting unit 53, an event managing unit 54 and a character creating unit 55. In the present embodiment, the units 51 to 55 are realized when the computer 10 illustrated in FIG. 1 executes the program 41 stored in the external storage device 40. This program 41 can be stored in a non-transitory computer-readable storage medium in advance and then distributed. Further, the program 41 may be downloaded to the computer 10 through the network 30.

Furthermore, the game control device 50 includes a storage unit 42. In the present embodiment, the storage unit 42 is provided in the external storage device 40.

The storage unit 42 stores information related to each virtual space of a plurality of players including the player A and the player B, and information related to characters which exist in each virtual space. The information related to each virtual space of a plurality of players includes information for displaying each virtual space on, for example, a communication terminal used by a player and information related to objects arranged in each virtual space. Further, the information related to characters which exist in the virtual space includes, for example, parameters of characters.

The virtual space managing unit 51 has a function of managing (information related to) each virtual space of a plurality of players. More specifically, the virtual space managing unit 51 manages each virtual space of a plurality of players and objects which exist in each virtual space referring to the storage unit 42, and, when a new object to be arranged in a virtual space of a player is created, registers information related to the object (a parameter of the object) in the storage unit 42. In addition, the parameter of the object includes, for example, the degree of rareness and a level as described below. Further, in each virtual space of a plurality of players, a plurality of objects may exist.

The character managing unit 52 has a function of managing (information related to) each character of a plurality of players. More specifically, the character managing unit 52 manages characters of a player which exist in each virtual space of a plurality of players by referring to the storage unit 42, and, when a new character to be arranged in the virtual space of the player is created, registers information related to the character (the parameter of the character) in the storage unit 42. In addition, the parameter of the character includes, for example, a class, the degree of rareness and a required point as described below. Further, in each virtual space of a plurality of players, a plurality of objects may exist.

The event starting unit 53 starts, for example, an event which associates a character of the player A and a character of the player B among characters of a plurality of players by referring to the storage unit 42. Two players (the player A and the player B) for whom an event which associates characters can be started have a relationship such as friends (companies), and are registered in advance. In addition, this registration information is stored in, for example, the storage unit 42.

The event managing unit 54 has a function of managing events started by the event starting unit 53.

When an event is started by the event starting unit 53, the event managing unit 54 transmits question information (first question information) related to the virtual space of the player A to the communication terminal 22 used by the player B. Further, the event managing unit 54 receives answer information (first answer information) to the question information transmitted to the communication terminal 22, from the communication terminal 22.

Meanwhile, the question information to be transmitted to the communication terminal 22 is, for example, information of a quiz format including a plurality of options related to the virtual space of the player A. In addition, this question information includes one correct option determined in advance among a plurality of options included in the question information. Meanwhile, the answer information received from the communication terminal 22 is information including an option selected by the player B from a plurality of options included in the question information transmitted to the communication terminal 22. The player B can select one of a plurality of options included in the question information transmitted to the communication terminal 22, through the communication terminal 22.

When the answer information is received from the communication terminal 22 as described above, the event managing unit 54 transmits question information (second question information) related to the virtual space of the player B to the communication terminal 21 used by the player A. Further, the event managing unit 54 receives answer information (second answer information) to the question information transmitted to the communication terminal 21, from the communication terminal 21.

Meanwhile, the question information to be transmitted to the communication terminal 21 is, for example, information of a quiz format including a plurality of options related to the virtual space of the player B. In addition, this question information includes one correct option determined in advance among a plurality of options included in the question information. Meanwhile, the answer information received from the communication terminal 21 is information including an option selected by the player A from a plurality of options included in the question information transmitted to the communication terminal 21. The player A can select one of a plurality of options included in the question information transmitted to the communication terminal 21, through the communication terminal 21.

The event managing unit 54 repeatedly executes alternately transmission and reception (referred to as an interaction between the player A and the player B below) of question information and answer information to and from the communication terminals 21 and 22. More specifically, the event managing unit 54 repeatedly executes alternately a first interaction and a second interaction. The first interaction is an interaction between the player A and the player B including transmission of question information related to the virtual space of the player A to the communication terminal 22 and reception of answer information related to the question information from the communication terminal 22. The second interaction is an interaction between the player A and the player B including transmission of question information related to the virtual space of the player B to the communication terminal 21 and reception of answer information to the question information from the communication terminal 21.

The event managing unit 54 determines whether or not the number of times of the repeatedly executed interaction between the player A and the player B (first and second interactions) reaches a predetermined value.

When the event managing unit 54 determines that the number of times of the interaction between the player A and the player B reaches a predetermined value, the character creating unit 55 acquires a parameter of a character of the player A and a parameter of a character of the player B stored in the storage unit 42. The character creating unit 55 creates a new character based on the acquired parameters.

In addition, a new character created by the character creating unit 55 is arranged in the virtual spaces of the player A and the player B. In this case, the character managing unit 52 registers in the storage unit 42 a parameter of the new character created by the character creating unit 55 as a character which exists in the virtual spaces of the player A and the player B.

Hereinafter, an outline of a game controlled by the game control device 50 according to the present embodiment will be described.

First, a character which exists in a virtual space of each player will be described with reference to FIG. 3.

In an example illustrated in FIG. 3, in the virtual space of the player A, there are characters A1 to A3 as characters of the player A. Further, in the virtual space of the player B, there are characters B1 to B3 as characters of the player B. Furthermore, in the virtual space of the player C, there are characters C1 and C2 as characters of the player C. Thus, in the virtual space of each player, there are a plurality of characters.

In addition, when a new character is created, an event is started and characters of a plurality of players are associated. A combination of two characters to be associated in an event is referred to as a couple below.

Hereinafter, conditions of a character which can become a couple with another character will be described more specifically. The conditions of a character which can become a couple with another character include first to third conditions described below.

First, according to the first condition, a character which can become a couple should be a favorite character. The favorite character is, for example, a character which is set to an object which exists in a virtual space. That is, the favorite character is required to create a new character, and an object needs to exist in a virtual space to obtain the favorite character. The object is created according to a character which exists in a virtual space. In addition, a type of the object which can be created is determined according to a parameter of a character.

According to the second condition, a character which has already become a couple with another character cannot be a couple with other characters. In the example illustrated in FIG. 3, when, for example, the character A1 of the player A already becomes a couple with the character B1 of the player B, the character A1 and the character B1 cannot be a couple with another character (for example, the character C1 of the player C). In addition, even a character which becomes a couple once can be a couple with another character after canceling the couple.

Further, according to the third condition, two given players cannot have a plurality of couples. In other words, the two players can have one couple. In the example illustrated in FIG. 3, when, for example, the character A1 of the player A is a couple with the character B1 of the player B, the character A3 of the player A cannot become a couple with the character B2 of the player B.

When two characters satisfy the above first to third conditions, the two characters can become a couple.

In addition, as described above, one character cannot become a couple with a plurality of other characters, and two players cannot have a plurality of couples.

However, a plurality of characters of a given player can become couples with characters of other players. That is, as illustrated in FIG. 3, even when the character A1 of the player A and the character B1 of the player B are a couple, the character A2 of the player A and the character C2 of the player C can become a couple and, similarly, the character B3 of the player B and the character C1 of the player C can become a couple.

Next, a flow of creating a new character will be conceptually described with reference to FIG. 4.

First, when a new character is created, the event starting unit 53 generates an event (social quest) which associates two characters (that is, makes a couple of the two characters) as described above. Hereinafter, a case where the character of the player A and the character of the player B are associated will be described as an example.

Meanwhile, generation (start) of an event includes auto start and manual start.

First, auto start of an event will be described. According to auto start of an event, when, for example, a player browses (displays) a virtual space of another player (that is, the player visits a town of another person), if predetermined conditions (referred to as auto start conditions below) are satisfied, the event can be automatically started. In addition, a case where a player browses a virtual space of another player includes, for example, a case where a command of the player A to display the virtual space of the player B on the communication terminal 21 used by the player A is received from the communication terminal 21 and a case where a command of the player B to display the virtual space of the player A on the communication terminal 22 used by the player B is received from the communication terminal 22.

Meanwhile, when it is assumed that the player A browses the virtual space of the player B, the auto start conditions include following (a1) to (a5).

(a1) The player A and the player B have not yet had a couple.

(a2) There are favorite characters which have not become a couple with other characters in the respective virtual spaces of the player A and the player B.

(a3) The respective virtual spaces of the player A and the player B have capacity for accommodating a new character.

(a4) There are three or more objects (buildings) in the respective virtual spaces of the player A and the player B.

(a5) One or more hours have passed since start of a previous social quest of the player A.

Next, manual start of an event will be described. According to manual start of an event, it is possible to start an event by specifying from a menu screen a character of another player which a player desires to become a couple with. Even in the case of a manual start, there are predetermined conditions (referred to as manual start conditions below) which need to be satisfied, which are similar to the auto start as described above. In addition, a character of another player which a player desires to become a couple with can be specified through a menu provided on a display screen of the communication terminal 21 when, for example, the player A specifies the character of the player B, and can be specified through a menu provided on a display screen of the communication terminal 22 when the player B specifies the character of the player A. Thus, according to manual start, it is possible to start an event by making an arbitrary combination of a character which exists in the virtual space of the player A and a character which exists in the virtual space of the player B. In addition, the character of another player which a player desires to become a couple with is a character (favorite character) which has not become a couple with another character.

Meanwhile, when it is assumed that an event is manually started when the player A specifies the character of the player B, the manual start conditions include, for example, following (m1) to (m5).

(m1) The player A and the player B have not yet had a couple.

(m2) There are favorite characters which have not become a couple with other characters in the virtual space of the player A.

(m3) The respective virtual spaces of the player A and the player B have capacity for accommodating a new character.

(m4) There are three or more objects (buildings) in the respective virtual spaces of the player A and the player B.

(m5) There is an object (such as a Wedding Hall) required to manually start an event, in the respective virtual spaces of the player A and the player B.

When, for example, an event which associates the character of the player A and the character of the player B is started by auto start or manual start as described above, an interaction is executed between the player A and the player B. In addition, the interaction between the player A and the player B is as described above, and therefore will not be described.

This interaction between the player A and the player B is repeatedly executed until the number of times of the interaction reaches a predetermined number of times. Meanwhile, the interaction is executed a predetermined number of times until a new character is created and after a new character is created.

More specifically, when an event which associates the character of the player A and the character of the player B is started, the degree of progress (referred to as the degree of friendliness below) of the interaction between the player A and the player B until a new character is created is set to 0%.

Meanwhile, when, for example, question information related to the virtual space of the player A is transmitted to the communication terminal 22 of the player B, and answer information to the question information is received from the communication terminal 22 of the player B (that is, an interaction between the player A and the player B is executed once), for example, 20% which is a predetermined value is added to the degree of friendliness (0% in this case).

Next, when, for example, question information related to the virtual space of the player B is transmitted to the communication terminal 21 of the player A, and the answer information to the question information is received from the communication terminal 21 of the player A (that is, an interaction between the player A and the player B is executed once), for example, 20% is further added to the degree of friendliness (20% in this case).

When this interaction between the player A and the player B is alternately repeated and this interaction is executed five times in total, the degree of friendliness becomes 100%. When the degree of friendliness is 100%, (a child of) a new character is created based on parameters of the character of the player A and the character of the player B. In this case, on the communication terminal 21 used by the player A and the communication terminal 22 used by the player B, a screen (for example, Marriage Movie) which displays that a new character is created may also be displayed.

When a new character is created as described above, the degree of progress (referred to as a degree of growth below) of the interaction between the player A and the player B after the new character is created is set to 0%.

Meanwhile, when, for example, question information related to the virtual space of the player B is transmitted to the communication terminal 21 of the player A, and answer information to the question information is received from the communication terminal 21 of the player A (that is, an interaction between the player A and the player B is executed once), for example, 20% which is a predetermined value is added to the degree of growth (0% in this case).

Next, when, for example, question information related to the virtual space of the player A is transmitted to the communication terminal 22 of the player B, and answer information to the question information is received from the communication terminal 22 of the player B (that is, an interaction between the player A and the player B is further executed once), for example, 20% is further added to the degree of growth (20% in this case).

When this interaction between the player A and the player B is alternately repeated and this interaction is executed five times in total, the degree of growth becomes 100%. When the degree of growth becomes 100%, (the child of) the above new character changes to a grown-up (a specific character), and the new character is arranged in the virtual space of the player A and the virtual space of the player B. By this means, the player A and the player B can acquire the new character. In this case, a parameter of the new character is stored in the storage unit 42 as the character of the player A and the character of the player B. In addition, when the degree of growth becomes 100% (the new character is arranged in the virtual space of the player A and the virtual space of the player B), the association (that is, a couple) between the character of the player A and the character of the player B is canceled.

As described above, when the interaction is executed ten times in total until a new character is created and after the new character is created, the player A and the player B can acquire a new character. However, the present invention is not limited to this, and by, for example, changing values of the degree of friendliness and the degree of growth added in one interaction, it is possible to change the number of times of an interaction required to acquire a new character. When, for example, the values of the degree of friendliness and the degree of growth added in one interaction are 10%, it is possible to change the number of times of the interaction required to acquire a new character to twenty times. Further, when, for example, the values of the degree of friendliness and the degree of growth added in one interaction are 50%, it is possible to change the number of times of the interaction required to acquire a new character to four times.

In addition, preferably, the degree of friendliness and the degree of growth matching the number of times of the interaction between the player A and the player B are adequately displayed on the communication terminal 21 and the communication terminal 22 used by the player A and the player B.

Hereinafter, the parameter of the above new character will be described more specifically. Meanwhile, the parameter of the new character created in an event which associates the character of the player A (referred to as a parent character of the player A below) and the character of the player B (referred to as a parent character of the player B) will be described.

The parameter of the new character is determined by parameters of the parent character of the player A and the parent character of the player B. In addition, the parameter of the character includes, for example, a tribe (class), the degree of rareness and a required point (required LOVE) as described below.

The tribe (referred to as a tribe of a new character below) included in the parameter of the new character is one of a tribe (referred to as a tribe of the parent character of the player A below) included in the parameter of the parent character of the player A and a tribe (referred to as a tribe of the parent character of the player B below) included in the parameter of the parent character of the player B. In addition, the probability that the tribe of the new character becomes the tribe of the parent character of the player A (or the tribe of the parent character of the player B) is, for example, 50%.

The degree of rareness (referred to as the degree of rareness of a new character below) included in the parameter of the new character is determined based on the degree of rareness (referred to as the degree of rareness of the parent character of the player A below) included in the parameter of the parent character of the player A and the degree of rareness (referred to as the degree of rareness of the parent character of the player B below) included in the parameter of the parent character of the player B. More specifically, the degree of rareness of the new character is an average value of the degree of rareness of the parent character of the player A and the degree of rareness of the parent character of the player B, that is, "(the degree of rareness of the parent character of the player A+the degree of rareness of the parent character of the player B)/2".

In addition, although an object can be created in a virtual space according to a character as described above, the tribe and the degree of rareness of a character are parameters which influence, for example, the type of the object to be created in the virtual space.

A required point (referred to as a required point of the new character below) included in the parameter of the new character is determined according to the tribe and the degree of rareness of the new character determined as described above. More specifically, the required point of the new character can be, for example, a value obtained by multiplying a numerical value allocated to the tribe of the new character and the degree of rareness of the new character. In addition, a required point of the new character is used to change the degree of rareness of the new character.

Hereinafter, a change of the degree of rareness of the new character using a required point will be described more specifically.

First, as described above, upon an interaction between the player A and the player B, for example, question information transmitted to the communication terminal 22 of the player B includes a plurality of options related to the virtual space of the player A. More specifically, question information includes as options a plurality of objects (buildings) which exist in the virtual space of the player A. Further, in this question information, for example, an object (a place which the player A wants to go) selected by the player A from a plurality of options (objects) which exists in the virtual space of the player A is set as a correct option. In addition, the correct option may be determined at random.

Meanwhile, a parameter which is included as an option in question information and whose object exists in the virtual space of the player A includes the degree of rareness and a level. The degree of rareness (referred to as the degree of rareness of an object below) included in the parameter of the object is a value determined in advance when the object is created. Further, the level (referred to as a level of an object below) included in the parameter of the object is a value which increases according to, for example, the number of times that, for example, the character of the player A which exists in the virtual space of the player A visits the object. A point (referred to as a designated point of an object) determined based on the degree of rareness and the level of the object is set to the object which exists in the virtual space of the player A. The designated point of this object can take a value obtained by, for example, multiplying the degree of rareness and the level of the object.

Meanwhile, upon the interaction between the player A and the player B, answer information received from the communication terminal 22 of the player B includes an option selected by the player B from a plurality of options (objects) included in the above question information.

Meanwhile, when the option included in the answer information received from the communication terminal 22 of the player B is correct, a point which is n times larger than the designated point of the correct object (option) is acquired. In addition, n is a value (for example, 1.5) higher than 1.

Meanwhile, when the option included in the answer information received from the communication terminal 22 of the player B is incorrect, a point which is m times larger than the designated point of the correct object (option) is acquired. In addition, m is a value (for example, 0.7) equal to or less than 1.

In the present embodiment, for example, an interaction is executed ten times until a new character is acquired as described above. Meanwhile, when a total value of points obtained according to whether the option included in answer information upon the interaction is correct or incorrect is a required point of the new character or more, a predetermined value (for example, one) is added to the degree of rareness of the new character. That is, when the number of times of selection of a correct option upon the interaction between the player A and the player B is high (that is, the acquired point is the required point or more), a character of a higher degree of rareness can be acquired.

Meanwhile, question information upon the interaction between the player A and the player B includes as options a plurality of objects which simply exists in the virtual space of the player A or the player B. However, the present invention is not limited this, and a configuration may be employed where a plurality of options included in question information upon an interaction executed after a new character is created are determined based on question information upon an interaction executed until a new character is created. More specifically, question information upon the interaction executed after the new character is created may include the same option (correct option) as that of question information upon the interaction executed until the new character is created.

In addition, although, in FIG. 4, an interaction is executed a predetermined number of times until a new character is created and after the new character is created, for example, an interaction executed after the new character is created may be skipped. In this case, the new character is created after the interaction is executed a predetermined number of times, and the new character only needs to be arranged in the virtual spaces of the player A and the player B.

Next, screens displayed on the communication terminal 21 used by the player A and the communication terminal 22 used by the player B will be simply described with reference to FIG. 5.

When, for example, the player A browses (displays) a virtual space of another player (player B), an event (social quest) which associates the character of the player A and the character of the player B is automatically started in some cases. When the event is automatically started, an auto start screen which displays that the event is automatically started is displayed on, for example, the communication terminal 21 used by the player A. Meanwhile, FIG. 6 illustrates an example of an auto start screen displayed on the communication terminal 21 used by the player A. As illustrated in FIG. 6, when, for example, the player A browses a virtual space of another player, if an event is automatically started, for example, a predetermined mark is displayed in the center of the screen to notify that the event is automatically started.

Figure 7:
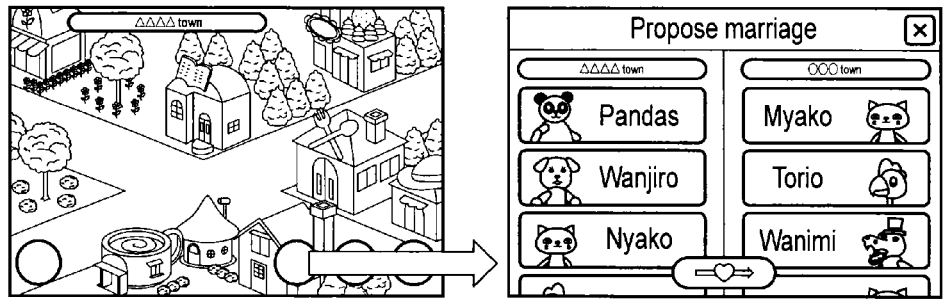
FIG. 7 is a view illustrating an example of a manual request screen displayed on the communication terminal 21 used by the player A.

Meanwhile, when an event is manually started when, for example, the player A specifies from a menu the character of another player (player B) who the player A desires to become a couple with as described above, a manual request screen is displayed on the communication terminal 21 used by the player A. Meanwhile, FIG. 7 illustrates an example of a manual request screen displayed on the communication terminal 21 used by the player A. As illustrated in FIG. 7, the player A can display the manual request screen from a menu such as a screen which displays a virtual space of another player, and specify a character who the player A desires to become a couple with and which exists in the virtual space of another player. It is possible to specify a character of a player in this way, and start an event when the above manual start conditions are satisfied.

Figure 8:
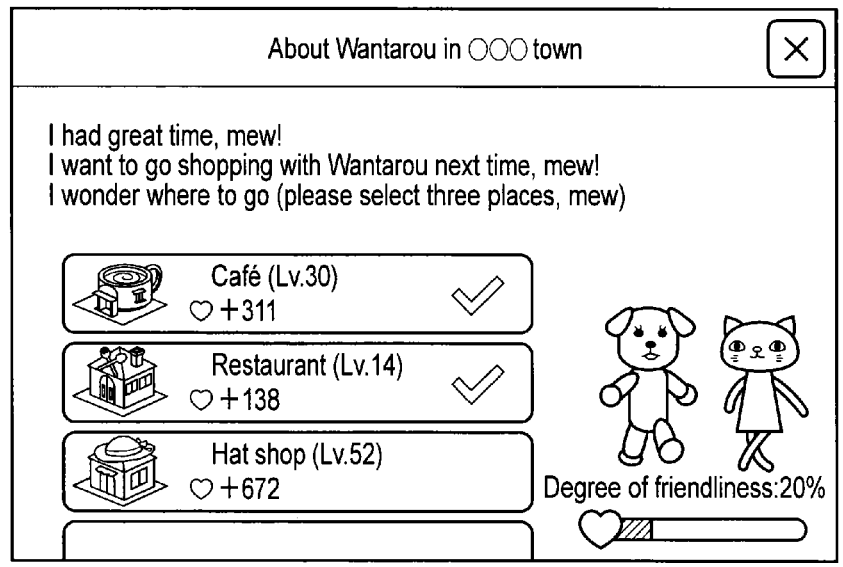
FIG. 8 is a view illustrating an example of a question screen displayed on the communication terminal 21 used by the player A.

When the event is started as described above, a question screen is displayed on the communication terminal 21 used by the player A. In addition, the question screen displayed on the communication terminal 21 is a screen for determining a plurality of options included in question information related to the virtual space of the player A. FIG. 8 illustrates an example of the question screen displayed on the communication terminal 21 used by the player A. As illustrated in FIG. 8, the player A determines as options included in question information three objects from objects (buildings) which exist in the virtual space of the player A in the question screen. When an option is determined in the question screen in this way, the question information including this option is transmitted to the communication terminal 22 used by the player B. Meanwhile, when the question information is transmitted to the communication terminal 22, the communication terminal 21 used by the player A displays a screen (question transmission rendition) which displays that, for example, question information illustrated in FIG. 9 is transmitted.

Further, when the question information related to the virtual space of the player A is transmitted to the communication terminal 22 used by the player B, the communication terminal 22 displays an answer screen. In addition, the answer screen displayed on the communication terminal 22 is a screen for selecting one (that is, an answer) of a plurality of options included in question information related to the virtual space of the player A. FIG. 10 illustrates an example of the answer screen displayed on the communication terminal 22 used by the player B. As illustrated in FIG. 10, the player B can select one of a plurality of options (a flower shop, a bookstore and a cake shop in this case) included in question information on the answer screen.

Figures 9, 10:
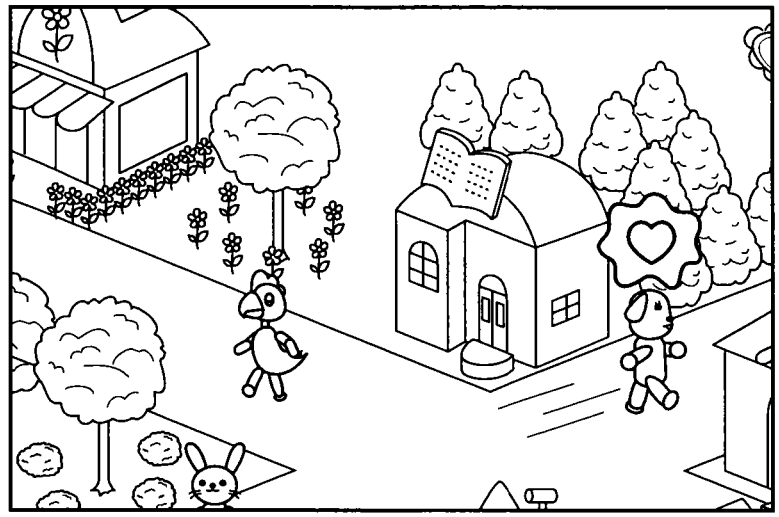
FIG. 9 is a view illustrating an example of a screen which displays that question information is transmitted.
FIG. 10 is a view illustrating an example of an answer screen displayed on the communication terminal 22 used by the player B.
Figure 11:
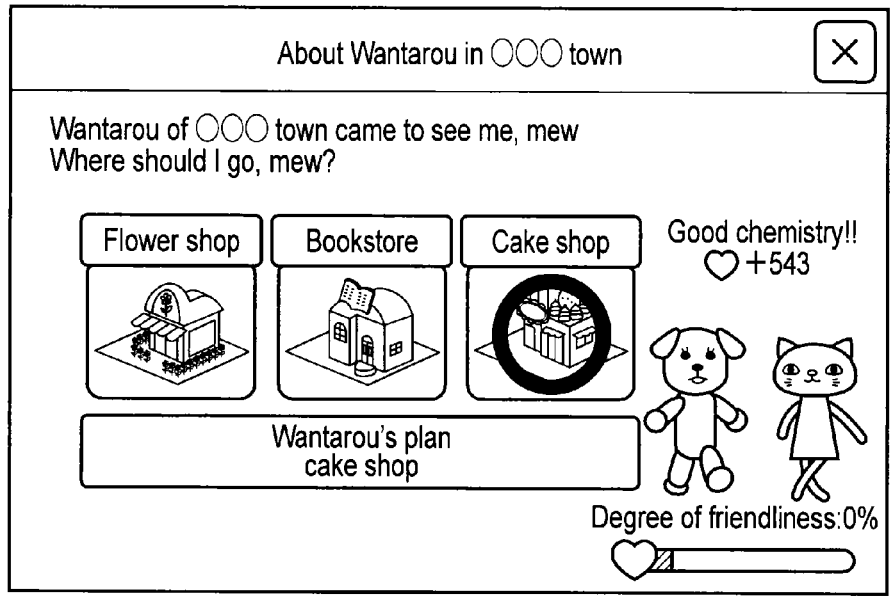
FIG. 11 is a view illustrating an example of a screen which displays that an option selected by the player B is correct.

Meanwhile, when the option selected by the player B is a correct option, the answer screen illustrated in FIG. 10 transitions to, for example, a screen illustrated in FIG. 11. On this screen illustrated in FIG. 11, it is possible for the player B to check that the option selected by the player B is correct and check a point (543 in this case) obtained by an answer of the player B.

Figure 12:
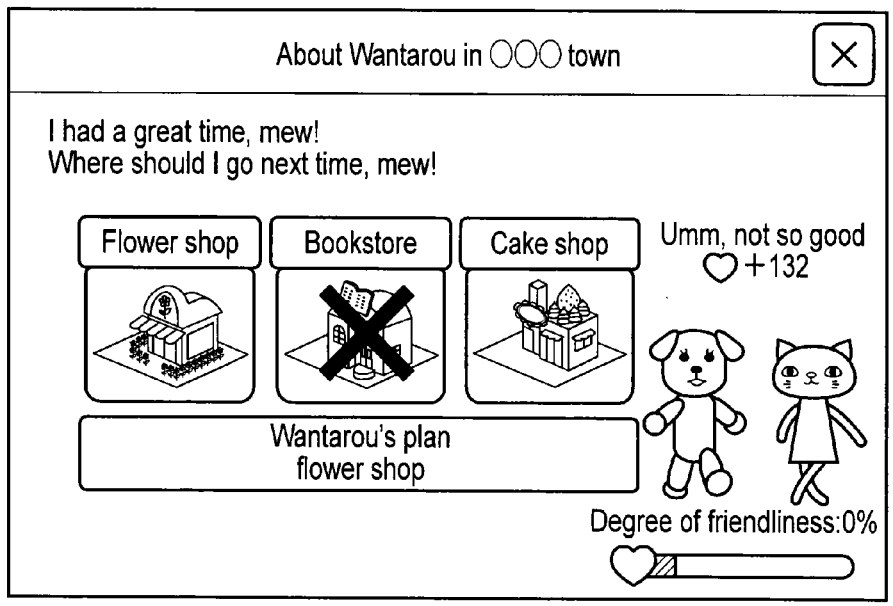
FIG. 12 is a view illustrating an example of a screen which displays that an option selected by the player B is incorrect.

Meanwhile, when the option selected by the player B is not a correct option (that is, an incorrect option), the answer screen illustrated in FIG. 10 transitions to, for example, a screen illustrated in FIG. 12. On this screen illustrated in FIG. 12, it is possible for the player B to check that the option selected by the player B is incorrect and check a point (132 in this case) obtained by the answer of the player B.

In addition, the point obtained in this case is as described above and therefore will not be described in detail.

Further, when the player B gives an answer as described above, a question screen is displayed on the communication terminal 22 used by the player B. In addition, the question screen is as described above, and therefore will not be described in detail. When, for example, the player B determines as options included in question information three objects from objects (buildings) which exist in the virtual space of the player B in the question screen, question information including the determined option is transmitted to the communication terminal 21 of the player A. In this case, the answer screen is displayed on the communication terminal 21 of the player A, so that the player A can select one option of a plurality of options included in the question information through the answer screen as described above.

As described above, the question screen and the answer screen are alternately displayed on the communication terminal 21 of the player A and the communication terminal 22 of the player B, so that an interaction between the player A and the player B is repeated.

In addition, an event which is currently started can be checked on a couple screen of a town or a quest list screen.

FIG. 13 illustrates an example of a couple screen of a town. In this couple screen of the town, two characters which become a couple are displayed in a virtual space (that is, in a town) together with a predetermined mark which represents the couple.

Further, FIG. 14 illustrates an example of a quest list screen. In this quest list screen, two characters which are a couple (a currently started event) are displayed as a list.

By checking this couple screen of the town and the quest list screen, the player can easily check with which character a character of the player becomes a couple and an event is started.

Further, by specifying a specific couple (event) displayed on the couple screen of the town and the quest list screen, it is possible to resume an interaction in the event.

In addition, although not illustrated in the couple screen of the town illustrated in FIG. 13 and the quest list screen illustrated in FIG. 14, a button (breakup button) for canceling a couple (that is, stopping an event) in these screens may be provided.

Next, processing of the game control device 50 according to the present embodiment will be described. First, the processing of the game control device 50 when an event is automatically started will be described with reference to the flowchart in FIG. 15.

When, for example, the player A plays a game (social game) controlled by the game control device 50, the player A activates the application for playing the game on the communication terminal 21 (step S1).

When the application is activated on the communication terminal 21 of the player A, the virtual space managing unit 51 refers to the storage unit 42, and displays a screen (referred to a town screen of the player A below) which displays the virtual space of the player A, on the screen of the communication terminal 21 (step S2).

Next, the character managing unit 52 refers to the storage unit 42, and determines whether or not there is a character in the virtual space of the player A (step S3). More specifically, the character managing unit 52 determines whether or not there is a favorite character in the virtual space of the player A.

When it is determined that the character exists in the virtual space of the player A (YES in step S3), the communication terminal 21 of the player A displays a screen (company list screen) which displays a list of players (that is, companies) registered in advance in association with the player A (step S4).

In this case, the player A can select one of players registered in advance through the company list screen displayed on the communication terminal 21 (step S5). More specifically, the player A selects a player whose virtual space the player A desires to browse (display). Meanwhile, the player B is selected.

In this case, the event starting unit 53 determines whether or not the above auto start conditions are satisfied between the player A and the selected player B (step S6). The auto start conditions include following (a1) to (a5).

(a1) There is no character among the characters of the player A which becomes a couple with the characters of the player B.

(a2) There are favorite characters among characters of the player A and the player B which have not become a couple with other characters.

(a3) The virtual spaces of the player A and the player B have capacity for accommodating a new character (there are empty objects corresponding to characters of the player A and the player B).

(a4) There are three or more objects (buildings) in the respective virtual spaces of the player A and the player B.

(a5) One or more hours have passed since an event (previous event) which associates the player A and another player.

In addition, the auto start conditions described herein are exemplary, and only part of the above conditions may be applied or other conditions may be included.

When determining that the auto start conditions are satisfied between the player A and the player B (YES in step S6), the event starting unit 53 performs a predetermined event start lot, and determines whether or not the lot is won (step S7).

When determining that the lot is won (YES in step S7), the event starting unit 53 starts an event which associates the character (favorite character) of the player A and the character (favorite character) of the player B (step S8). The characters of the player A and the player B to be associated in the started event are adequately selected according to conditions of characters which can become a couple.

In addition, when the event is started as described above, the communication terminal 21 of the player A displays the above event start screen as illustrated in FIG. 6 (step S9). Further, that the event is started may be notified to the communication terminal 22 of the player B.

Meanwhile, when it is determined in step S3 that a character does not exist in the virtual space of the player A, when it is determined in step S6 that the auto start conditions are not satisfied between the player A and the player B or when it is determined in step S7 that a lot is not won, the event is not started.

In addition, although described as the processing in step S7 is executed herein, this processing in step S7 may be skipped. That is, a configuration may be employed where, when it is determined in step S6 that the auto start conditions are satisfied between the player A and the player B, processing in step S8 is executed without performing an event start lot.

Next, processing of the game control device 50 when an event is manually started will be described with reference to the flowchart in FIG. 16.

First, processing in steps S11 to S15 corresponding to the processing in steps S1 to S5 illustrated in FIG. 15 is executed. In addition, when, for example, the player B is selected in step S15 and when the above event is not automatically started, the communication terminal 21 of the player A displays a screen (referred to as a town screen of the player B below) which displays the virtual space of the player B.

Meanwhile, the player A can display a manual request screen as illustrated in above FIG. 7 from, for example, a menu provided on the town screen of the player B displayed on the communication terminal 21 (step S16). On this manual request screen, for example, a list of characters of the player B is displayed. The player A can specify the character of the player B which the character of the player A desires to become a couple with through this manual request screen. In addition, the character of the player B which can be specified by the player A is, for example, a favorite character (that is, a character which can become a couple with the character of the player A) which does not become a couple with another character.

In this case, whether or not the above manual start conditions are satisfied between the player A and the player B whose character is specified on the auto request screen is determined (step S17). The manual start conditions include following (m1) to (m5).

(m1) There is no character among the characters of the player A which becomes a couple with the character of the player B.

(m2) There are favorite characters among characters of the player A which have not become a couple with other characters.

(m3) The virtual spaces of the player A and the player B have capacity for accommodating a new character (there are empty objects corresponding to characters of the player A and the player B).

(m4) There are three or more objects (buildings) in the respective virtual spaces of the player A and the player B.

(m5) There is an object such as a Wedding Hall required to manually start an event, in the virtual spaces of the player A and the player B.

In addition, the manual start conditions described herein are exemplary, and only part of the above conditions may be applied or other conditions may be included.

When determining that the auto start conditions are satisfied between the player A and the player B (YES in step S17), the event starting unit 53 starts an event which associates the character (favorite character) of the player A and the character (favorite character) of the player B (step S18). The characters of the player A to be associated in the started event are adequately selected according to conditions of characters which can become a couple. Meanwhile, the character of the player B to be associated with in the started event is the character of the player B specified by the player A through the above manual start screen.

In addition, when the event is started as described above, that the event is started may be notified to the communication terminal 21 of the player A and the communication terminal 22 of the player B.

Meanwhile, when it is determined in step S13 that a character does not exist in the virtual space of the player A or when it is determined in step S17 that the auto start conditions are not satisfied between the player A and the player B, the event is not started.

Next, processing of the game control device 50 when an event is started will be described with reference to the flowcharts in FIGS. 17 and 18. Hereinafter, a case where the character of the player A and the character of the player B are associated will be described. In addition, when an event is started, the degree of progress (the degree of friendliness) of an interaction between the player A and the player B is set to 0%.

When the event is started by processing illustrated in FIG. 15 or 16, the event managing unit 54 displays the question screen as illustrated in above FIG. 8 on the communication terminal 21 of the player A (step S21).

In this case, the player A can select, for example, three objects from a plurality of objects which exist in the virtual space of the player A through the question screen displayed on the communication terminal 21.

In this case, the event managing unit 54 generates question information including the three objects selected by the player A as options (step S22). In addition, the question information generated by the event managing unit 54 includes a correct option determined in advance. For example, this correct option may be determined by the player A or may be determined at random.

Next, the event managing unit 54 notifies the generated question information to the communication terminal 22 of the player B (step S23). When the question information is notified to the communication terminal 22 by the event managing unit 54 in this way, the notice is displayed on, for example, the screen of the communication terminal 22.

Meanwhile, an application which the player B uses to play the game controlled by the game control device 50 is activated on the communication terminal 22 of the player B.

In this case, the event managing unit 54 displays the answer screen as illustrated in above FIG. 10 on the communication terminal 22 of the player B (step S24).

In this case, the player B can select one of a plurality of options included in the question information generated in step S22, through the answer screen displayed on the communication terminal 22.

The event managing unit 54 acquires (determines) a point matching whether the option selected by the player B through the answer screen displayed on the communication terminal 22 is correct or incorrect (step S25). In addition, the point acquired in this case is as described above, and therefore will not be described in detail.

Next, the event managing unit 54 adds, for example, 20% to the above degree of friendliness (step S26). In addition, 20% to be added is a value matching one interaction between the player A and the player B.

The event managing unit 54 determines whether or not the interaction between the player A and the player B (transmission of question information and reception of answer information in the game control device 50) is executed a predetermined number of times, according to (a value of) the degree of friendliness (step S27). In this case, when the degree of friendliness is 100%, it is determined that the interaction between the player A and the player B is executed a predetermined number of times. In other words, when a predetermined value to be added in step S26 is 20%, the interaction needs to be executed five times until the degree of friendliness is 100%, and a predetermined number of times in step S27 is five times.

When it is determined that the interaction between the player A and the player B is not executed a predetermined number of times (NO in step S27), the step returns to step S21 and processing is repeated. In this case, processing is repeated assuming that the player B is a question giver and the player A is a responder. In other words, until the interaction between the player A and the player B is executed a predetermined number of times, processing is repeated by switching players who become a question giver and a responder.

Meanwhile, when it is determined that the interaction between the player A and the player B is executed a predetermined number of times (YES in step S27), the character creating unit 55 acquires from the storage unit 42 the parameters of the character of the player A and the character of the player B which are associated in the event started by the event starting unit 53, and creates a new character (child) based on the parameters (step S28). In addition, the parameter of the new character includes, for example, a tribe, the degree of rareness and a required point as described below. The details of the parameter of the new character are as described above, and therefore will not be described in detail.

When a new character (child) is created, the degree of progress (the degree of growth) of the interaction between the player A and the player B is set to 0%.

Hereinafter, processing in steps S29 to S35 corresponding to the processing in above steps S21 to S27 is executed.

More specifically, the event managing unit 54 displays a question screen on, for example, the communication terminal 22 of the player B (step S29).

In this case, the player B can select, for example, three objects from a plurality of objects which exist in the virtual space of the player B through the question screen displayed on the communication terminal 22.

In this case, the event managing unit 54 generates question information including the three objects selected by the player B as options (step S30).

Next, the event managing unit 54 notifies the generated question information to the communication terminal 21 used by the player A (step S31).

In this case, the event managing unit 54 displays the answer screen on the communication terminal 21 of the player A (step S32). In addition, when the application for playing the game on the communication terminal 21 of the player A is not activated, the answer screen is displayed after the application is activated.

In this case, the player A can select one of a plurality of options included in the question information generated in step S30, through the answer screen displayed on the communication terminal 21.

The event managing unit 54 acquires (determines) a point in accordance with whether the option selected by the player A through the answer screen displayed on the communication terminal 21 is correct or incorrect (step S33).

Next, the event managing unit 54 adds, for example, 20% to the above degree of growth (step S34).

The event managing unit 54 determines whether or not the interaction between the player A and the player B (transmission of question information and reception of answer information in the game control device 50) is executed a predetermined number of times, according to (a value of) the degree of growth (step S35).

When it is determined that the interaction between the player A and the player B is not executed a predetermined number of times (NO in step S35), the step returns to step S29 and processing is repeated. When processing is performed as described above assuming that the player B is a question giver and the player A is a responder, processing is repeated assuming that the player A is a question giver and the player B is a responder.

Meanwhile, when it is determined that an interaction between the player A and the player B is executed a predetermined number of times (YES in step S35), the character creating unit 55 creates a new character (grown-up) based on the above new character (child) (step S36). More specifically, the character creating unit 55 changes the new character (child) to a new character (grown-up).

Next, whether or not a sum of points (accumulated points) acquired in above steps S25 and S34 is a certain value or more is determined (step S37). Meanwhile, the certain value is the required points (value) included in the parameter of the new character created by the character creating unit 55.

When it is determined that the accumulated points equal a certain value (required points) or more (YES in step S37), one is added to the degree of rareness included in the parameter of the new character created by the character creating unit 55 (step S38).

The new character created in this way is arranged in the respective virtual spaces of the player A and the player B (step S39). By this means, the player A and the player B can acquire (get) the new character.

In addition, when it is determined in step S37 that the accumulated points do not equal a certain value (required points) or more, processing in step S38 is not executed.

In the present embodiment, by repeating the interaction between the player A and the player B a predetermined number of times as described above, the player A and the player B can acquire (create) a new character.

Figure 18:
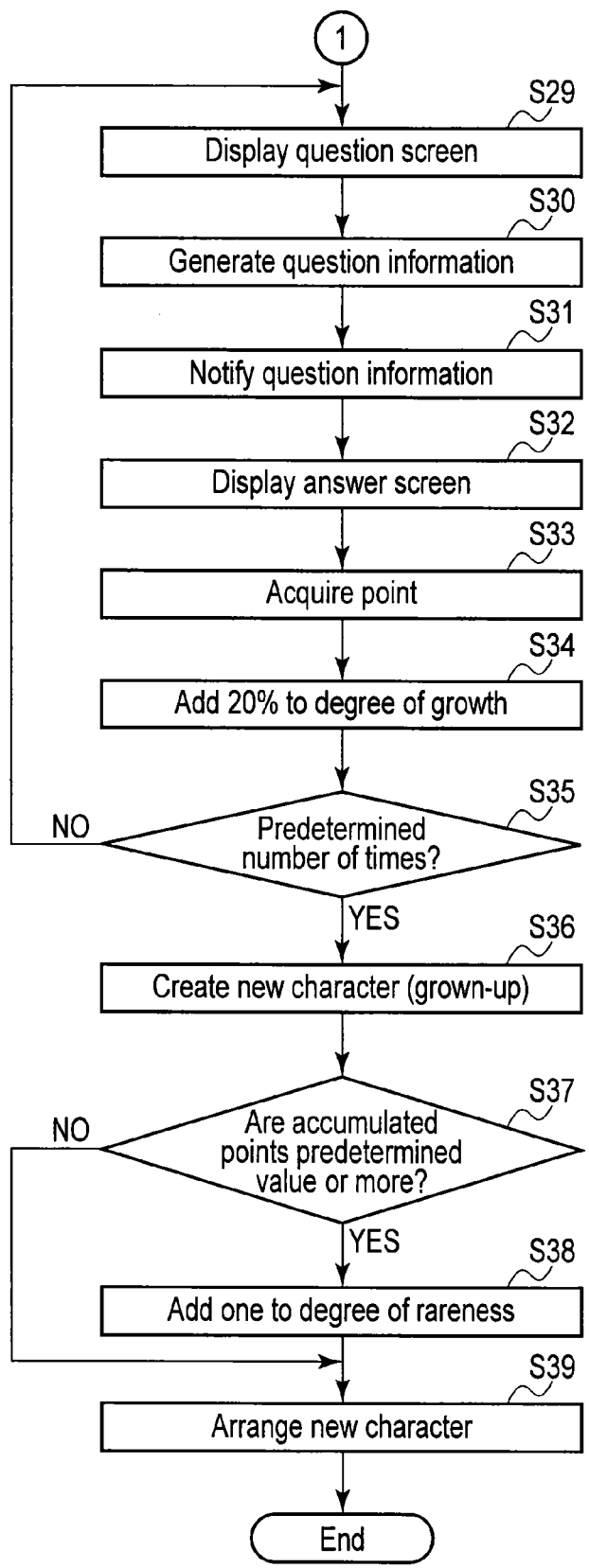
FIG. 18 is a flowchart illustrating processing of the game control device 50 when an event is started according to the present embodiment.

In addition, although processing in steps S21 to S39 is executed in FIGS. 17 and 18, the processing in steps S29 to S36 may be skipped. In this case, a new character needs to be created after the interaction between the player A and the player B is executed a predetermined number of times, and the new character only needs to be arranged in the respective virtual spaces of the player A and the player B.

Further, when it is determined that the accumulated points equal a certain value (required points) or more, one is added to the degree of rareness included in the parameter of the new character. However, the present invention is not limited to this, and a probability (probability of occurrence) that a character of a high degree of rareness and a character of a low degree of rareness are generated is individually set according to the parameter of the character of the player A and the parameter of the character of the player B (class and the degree of rareness) which are associated by the event, and a configuration may also be employed where, when the above required points are maximum, the probability that the character of a high degree of rareness is created becomes, for example, three times greater.

As described above, in the present embodiment, according to a configuration where an event which associates the character of the player A and the character of the player B is started, when the event is started, question information related to the virtual space of the player A is transmitted to the communication terminal 22 of the player B, answer information to the question information is received from the communication terminal 22 and when the answer information is received, question information related to the virtual space of the player B is transmitted to the communication terminal 21 of the player A, answer information to the question information is received from the communication terminal 21, and an interaction including transmission of the question information and reception of the answer information is repeatedly executed alternately, when the number of times of the interaction reaches a predetermined value, a new character is created based on the parameter of the character of the player A and the parameter of the character of the player B stored in the storage unit 42, and the new character is arranged in the virtual space of the player A and the virtual space of the player B, a plurality of players can collaborate and create a character and, consequently, it is possible to increase amusement.

Further, in the present embodiment, according to a configuration where question information includes a plurality of options and answer information includes an option selected by a player from a plurality of options included in the question information, the player can execute the above interaction merely by a simple operation.

As described above, in the present embodiment, the communication terminal 21 and the communication terminal 22 used by the player A and the player B are connected to and can perform communication with the game control device 50. In addition to this, when, for example, the communication terminal 21 is off-line and cannot perform communication with the game control device 50, for example, information related to the virtual space of the player A and information related to a character which exists in the virtual space among information stored in the above storage unit 42 are stored inside the communication terminal 21. By this means, even when, for example, the communication terminal 21 is off-line, for example, creation of an object (creation of the object arranged in the virtual space of the player A) which can be performed without performing communication with, for example, the game control device 50 can be performed. In addition, even when the communication terminal 21 is on-line, information (the information related to the virtual space of the player A and information related to the character which exists in the virtual space) stored inside the communication terminal 21 only needs to be passed to the game control device 50 to resume a game.

Further, although, in the present embodiment, the question information related to the virtual space of the player A is transmitted to the communication terminal 22 of the player B, the question information to be transmitted to the communication terminal 22 is not limited to the virtual space of the player A. For example, the question information may be information related to the virtual space of the player B or may be related to a virtual space of another player. Similarly, the question information to be transmitted to the communication terminal 21 is not limited to information related to the virtual space of the player B.

In addition, although the application program for playing the game in the present embodiment is downloaded to the communication terminals 21 and 22 and is installed to the communication terminals 21 and 22 and used, the game may be realized by a web application used by a web browser of the communication terminals 21 and 22 which operates on the game control device (web server) 50.

Second Embodiment

Next, the second embodiment of the present invention will be described. In addition, a hardware configuration of a network system including a game control device according to the present embodiment and a functional configuration of the game control device according to the present embodiment are the same as those of the above first embodiment, and therefore will be described where necessary using FIGS. 1 and 2. In the following description, the same portions as those in the above first embodiment will not be described in detail, and different portions from those of the first embodiment will be mainly described.

The present embodiment differs from the above first embodiment in that, when, for example, after question information is transmitted to the communication terminal 22 (or the communication terminal 21), answer information to the question information is not received in a predetermined period (referred to auto advance interval period), an event is automatically advanced.

More specifically, when, after question information (first question information) related to a virtual space of the player A is transmitted to the communication terminal 22, answer information (first answer information) to the question information is not received from the communication terminal 22 in an auto advance interval period as described above, the event managing unit 54 included in the game control device 50 according to the present embodiment transmits a notice (referred to as an event advance notice below) that the event is advanced to the communication terminal 21. In addition, in the present embodiment, transmission of question information related to the virtual space of the player A to the communication terminal 22 and transmission of an event advance notice to the communication terminal 21 (third interaction) is included in an interaction between the player A and the player B (that is, it is counted as one interaction between the player A and the player B).

When the interaction between the player A and the player B including transmission of the question information related to the virtual space of the player A to the communication terminal 22 and transmission of the event advance notice to the communication terminal 21 is executed, the event managing unit 54 skips the interaction between the player A and the player B executed after the above interaction. That is, after the interaction including transmission of the question information to the communication terminal 22 and transmission of the event advance notice to the communication terminal 21 is executed, an interaction (second interaction) between the player A and the player B including transmission of question information related to the virtual space of the player B to the communication terminal 21 and reception of answer information to the question information from the communication terminal 21 is skipped. That is, when the interaction between the player A and the player B including transmission of question information related to the virtual space of the player A to the communication terminal 22 and transmission of the event advance notice to the communication terminal 21 is executed, the interaction (first interaction) between the player A and the player B including transmission of question information related to the virtual space of the player A to the communication terminal 22 and reception of answer information to the question information from the communication terminal 22 or the interaction (third interaction) between the player A and the player B including transmission of the question information related to the virtual space of the player A to the communication terminal 22 and transmission of the event advance notice to the communication terminal 21 is executed.

Similarly, when, after question information (second question information) related to the virtual space of the player B is transmitted to the communication terminal 21, answer information (second answer information) to the question information is not received from the communication terminal 21 in the auto advance interval period, the event managing unit 54 transmits the event advance notice to the communication terminal 22. In addition, in the present embodiment, transmission of question information related to the virtual space of the player B to the communication terminal 21 and transmission of an event advance notice to the communication terminal 22 (fourth interaction) are included in an interaction between the player A and the player B (that is, it is counted as one interaction between the player A and the player B).

When the interaction between the player A and the player B including transmission of the question information related to the virtual space of the player B to the communication terminal 21 and transmission of the event advance notice to the communication terminal 22 is executed, the event managing unit 54 skips the interaction between the player A and the player B executed after the above interaction. That is, after the interaction including transmission of the question information to the communication terminal 21 and transmission of the event advance notice to the communication terminal 22 is executed, an interaction (first interaction) between the player A and the player B including transmission of question information related to the virtual space of the player A to the communication terminal 22 and reception of answer information to the question information from the communication terminal 22 is skipped. That is, when the interaction between the player A and the player B including transmission of question information related to the virtual space of the player B to the communication terminal 21 and transmission of the event advance notice to the communication terminal 22 is executed, the interaction (second interaction) between the player A and the player B including transmission of question information related to the virtual space of the player B to the communication terminal 21 and reception of answer information to the question information from the communication terminal 21 or the interaction (fourth interaction) between the player A and the player B including transmission of the question information related to the virtual space of the player B to the communication terminal 21 and transmission of the event advance notice to the communication terminal 22 is executed.

Hereinafter, a flow of an interaction between the player A and the player B according to the present embodiment will be simply described with reference to FIG. 19.

In the following description, transmission of question information related to the virtual space of the player A to the communication terminal 22 is referred to as a question of the player A for the sake of convenience. Further, reception of answer information to the question information related to the virtual space of the player A from the communication terminal 22 is referred to as an answer of the player B. Similarly, transmission of question information related to the virtual space of the player B to the communication terminal 21 is referred to as a question of the player B. Further, reception of answer information to the question information related to the virtual space of the player B from the communication terminal 21 is referred to as an answer of the player A.

Figure 19:
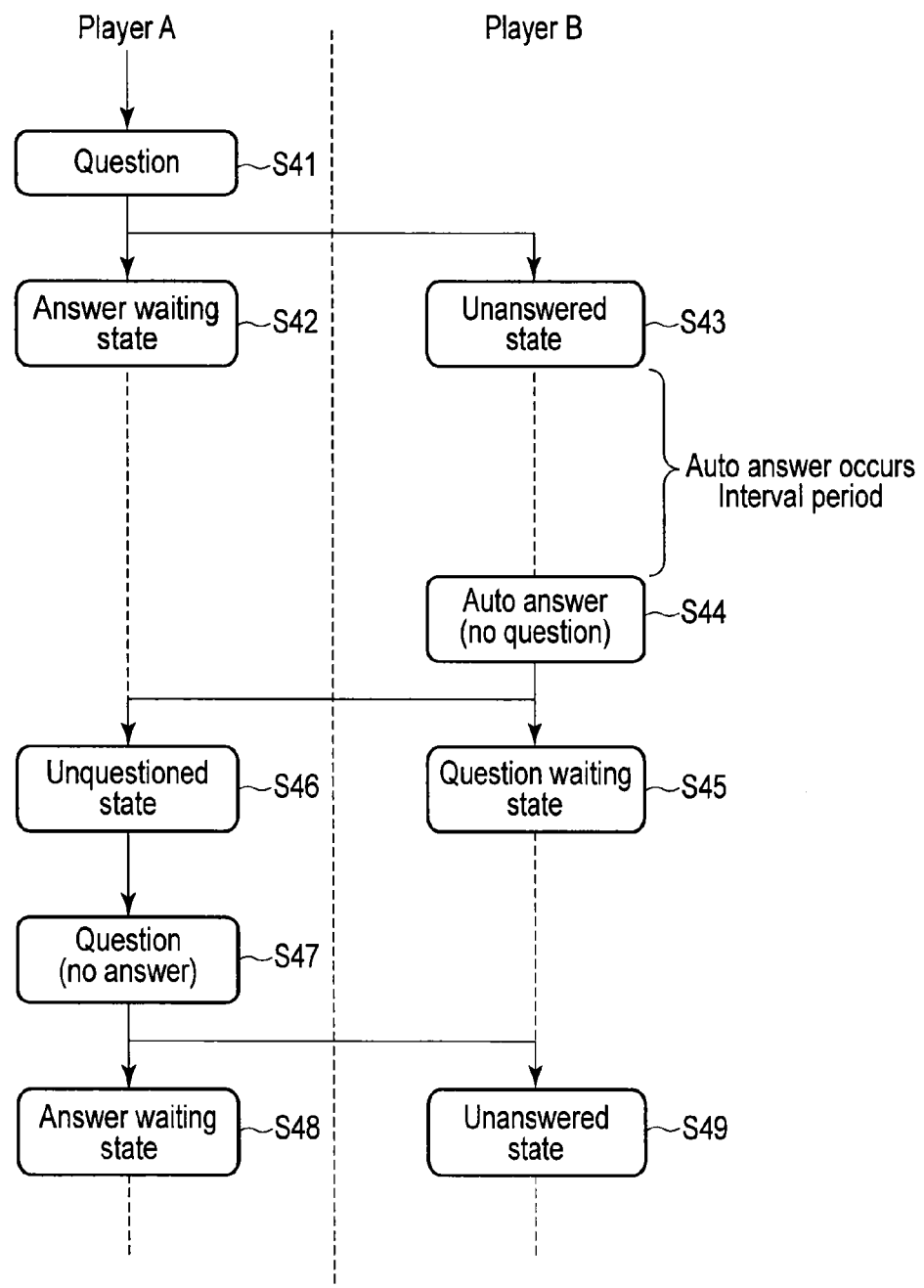
FIG. 19 is a view for explaining a flow of an interaction between the player A and the player B according to a second embodiment of the present invention.

When an event which associates the character of the player A and the character of the player B is started as described above, the player A gives a question as illustrated in FIG. 19 (step S41).

When the player A gives a question in this way, the player A enters an answer waiting state for the player B (step S42). Meanwhile, the player B enters an unanswered state (a state where the player B does not give an answer) to the question of the player A (step S43).

Meanwhile, when the player B does not give an answer in an auto advance interval period after the player A gives a question, an event is advanced assuming that the player B gives the answer (step S44). In this case, the event advance notice for notifying that the event is advanced is transmitted from the game control device 50 to the communication terminal 21. Hereinafter, transmission of an event advance notice in the case that the player B does not give an answer in the auto advance interval period is referred to as an auto answer for the sake of convenience.

In addition, after such an auto answer is given (an event advance notice is transmitted to the communication terminal 21), the player B cannot give an answer to the question of the player A in step S41.

Further, although the player B gives a question after the player B gives the answer in the above first embodiment, the player B does not give (skips) a question when the auto answer is given in the present embodiment.

That is, when the auto answer is given as described above, the player B enters a question waiting state for the player A (step S45).

Meanwhile, the player A enters an unquestioned state (a state where the player A does not give a question) with respect to the player B (step S46). In this case, the player A gives a question according to the operation of the player A using the communication terminal 21 (step S47). In addition, the player B does not give a question as described above, and the player A does not give (skips) an answer.

When the player A gives a question in this way, the player A enters an answer waiting state for the player B (step S48). Meanwhile, the player B enters an unanswered state to the question of the player A (step S49). Subsequently, the interaction between the player A and the player B is repeated likewise. In addition, when, for example, the player A gives a question in step S47, the player B can give an answer to the question by operating the communication terminal 22 in the auto advance interval period. Meanwhile, when the player B does not give an answer in the auto advance interval period, an auto answer is given as described above.

Hereinafter, screens displayed on the communication terminals 21 and 22 upon the interaction between the player A and the player B described with reference to FIG. 19 will be described.

Figure 20:
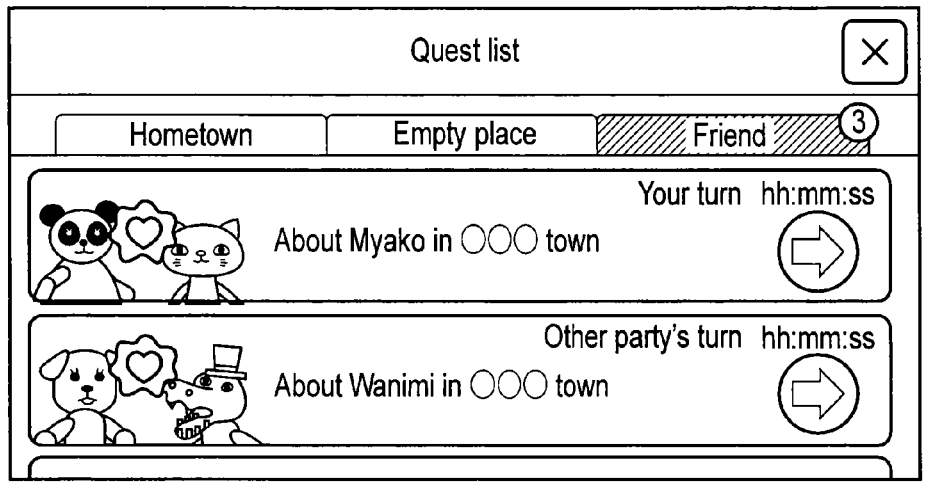
FIG. 20 is a view illustrating an example of a quest list screen.

FIG. 20 illustrates an example of a quest list screen which allows a currently started event to be checked. Meanwhile, when the quest list screen illustrated in FIG. 20 is displayed on the communication terminal 22, the quest list screen displays per currently started event a state where the player B needs to give an answer (referred to as "your turn") and a state where another player (for example, the player A) needs to give an answer (referred to as "other party's turn"). Further, per currently started event, the quest list screen displays as "hh:mm:ss" (a time until) an auto advance interval period (passes). On the quest list screen displayed on this communication terminal 22, the player B can check, for example, an event to which an answer needs to be given and the time which passes until the auto answer is given.

Figure 21:
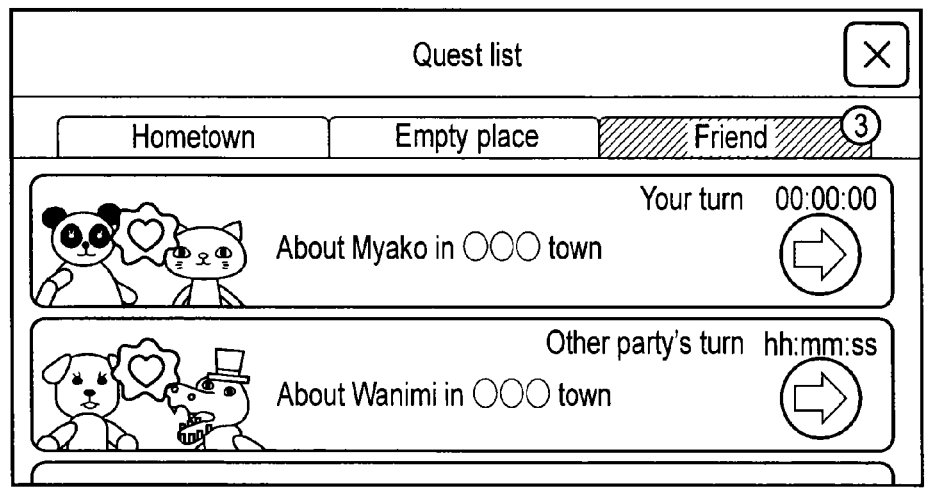
FIG. 21 is a view illustrating an example of a quest list screen when an auto advance interval period passes.

Meanwhile, FIG. 21 illustrates an example of a quest list screen when an auto advance interval period passes (that is, when an auto answer is given). When the auto advance interval period passes, the auto advance interval period is displayed as "00:00:00" as illustrated in FIG. 21. In addition, although the auto answer is given when the auto advance interval period passes as described above, an unanswered state is displayed on the quest list screen even when the auto answer is given.

Meanwhile, when an event (task) which passes the auto advance interval period is selected on the quest list screen illustrated in FIG. 21, the communication terminal 22 displays the screen illustrated in FIG. 22 (a screen which displays that an auto answer is given). When the screen illustrated in FIG. 22 is displayed, a state (for example, the degree of friendliness) of the event on the quest list screen is updated to the latest state.

Further, when the auto answer is given as described above, the communication terminal 21 used by the player A displays an event advance notice. FIG. 23 illustrates an example of the screen of the communication terminal 21 which displays an event advance notice.

Figure 24:
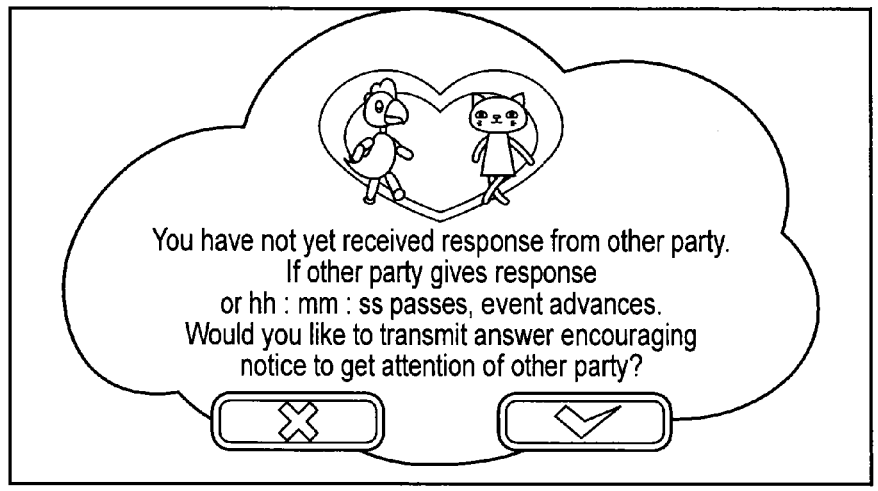
FIG. 24 is a view illustrating an example of a screen when an answer encouraging notice is transmitted.
Figure 25:
FIG. 25 is a view illustrating an example of a screen after an answer encouraging notice is transmitted.

In addition, in, for example, the auto advance interval period and the answer waiting state for the player B, the player A can transmit a notice (referred to an answer encouraging notice below) for encouraging the player B to give an answer from the game control device 50 to the communication terminal 22 used by the player B. More specifically, in the answer waiting state for the player B, the screen of the communication terminal 21 transitions from the above quest list screen to the screen illustrated in FIG. 24, and the player A can command transmission of the answer encouraging notice from the screen. In addition, when the answer encouraging notice is transmitted, the communication terminal 21 displays the screen illustrated in FIG. 25. Further, the answer encouraging notice can be transmitted per certain period. When the certain period does not pass after the answer encouraging notice is transmitted and when the player A transmits the answer encouraging notice again, the communication terminal 21 displays the screen as illustrated in FIG. 26.

In addition, although a case has been described with reference to, for example, FIG. 19 where the player B does not give an answer in the auto advance interval period, even when the player A does not give an answer in the auto advance interval period, an auto answer is given likewise (that is, the event is advanced assuming that the player A gives an answer).

By this means, in the present embodiment, even when the player A or the player B does not give an answer, the event can be advanced every time the auto advance interval passes.

Next, processing of the game control device 50 when an event is started in the present embodiment will be described with reference to the flowcharts in FIGS. 27 and 28. Hereinafter, a case where the character of the player A and the character of the player B are associated will be described. In addition, when an event is started, the degree of progress (the degree of friendliness) of an interaction between the player A and the player B is set to 0%.

First, when an event is started, processing in steps S51 to S53 corresponding to the processing in steps S21 to S23 illustrated in above FIG. 17 is executed.

Meanwhile, the event managing unit 54 determines whether or not the auto advance interval period passes after question information is notified to the communication terminal 22 in step S53 (step S54). In addition, a time at which the question information is notified to the communication terminal 22 in step S53 and (information of) the auto advance interval period are managed inside the game control device 50.

When it is determined that the auto advance interval period has not passed (NO in step S54), if the application which the player B uses to play the game controlled by the game control device 50 is activated on the communication terminal 22 used by the player B, processing in steps S55 to S59 corresponding to the processing in steps S24 to S28 illustrated in above FIG. 17 is executed, similarly to the above first embodiment.

In addition, even when the answer screen is displayed in step S55, if the player B does not give an answer (an operation of selecting one of a plurality of options included in question information generated in step S52), processing subsequent to step S56 is not executed and processing in above step S54 is repeatedly executed.

Meanwhile, when it is determined that the auto advance interval period passes (YES in step S54), the event managing unit 54 transmits an event advance notice for notifying that the event is advanced to the communication terminal 21 (step S60). By this means, the event is advanced assuming that the player B gave an answer. In addition, in this case, the communication terminal 21 displays the screen as illustrated in above FIG. 23.

Further, when, after the event advance notice is transmitted to the communication terminal 21 (that is, after an auto answer is given), the application which the player B uses to play the game controlled by the game control device 50 is activated on the communication terminal 22 used by the player B, as illustrated in above FIG. 21, the auto advance interval period is displayed as "00:00:00". Further, when an event (task) which passes the auto advance interval period is selected on the quest list screen illustrated in FIG. 21, the communication terminal 22 displays that the auto answer is given on the screen of the communication terminal 22 as illustrated in above FIG. 22.

When processing in step S60 is executed, processing in steps S56 to S59 is executed. In addition, a point (that is, a point obtained when the auto answer is given) acquired (determined) in the processing in step S56 in this case is lower than a point obtained when, for example, the option selected by the player B (that is, an answer of the player B) is incorrect. When it is determined in step S58 that the interaction between the player A and the player B is not executed a predetermined number of times in this case, the step returns to step S51 and processing is repeated assuming that the player A is a question giver and the player B is a responder.

That is, in the present embodiment, when the player B gives an answer to the question of the player A, after an interaction between the player A and the player B including the question of the player A and the answer of the player B, an interaction including a question of the player B and an answer of the player A is executed. Meanwhile, when the player B does not give an answer to the question of the player A (that is, an auto answer is given), the interaction between the player A and the player B which assumes that the player B is a question giver and the player A is a responder (that is, including the question of the player B and the answer of the player A) and which is executed after the interaction between the player A and the player B including the question of the player A and the auto answer is skipped.

When the processing in step S59 is executed, the degree of progress (the degree of growth) of the interaction between the player A and the player B is set to 0%, and processing in steps S61 to S63 corresponding to the processing in steps S29 to S31 illustrated in above FIG. 18 is executed.

Meanwhile, the event managing unit 54 determines whether or not the auto advance interval period passes after question information is notified to the communication terminal 22 in step S63 (step S64). In addition, (information of) a time at which the question information is notified to the communication terminal 22 in step S63 is managed inside the game control device 50.

When it is determined that the auto advance interval period does not pass (NO in step S64), if the application which the player B uses to play the game controlled by the game control device 50 is activated on the communication terminal 22 used by the player B, processing in steps S65 to S72 corresponding to the processing in steps S32 to S39 illustrated in above FIG. 18 is executed similar to the above first embodiment.

In addition, even when the answer screen is displayed in step S65, if the player B does not give an answer (that is, an operation of selecting one of a plurality of options included in question information generated in step S62), processing subsequent to step S66 is not executed and processing in above step S64 is repeatedly executed.

Meanwhile, when it is determined that the auto advance interval period passes (YES in step S64), the event managing unit 54 transmits an event advance notice that the event is advanced, to the communication terminal 21 (step S73). By this means, the event is advanced assuming that the player B gave an answer.

When processing in step S73 is executed, the processing in steps S66 to S72 is executed. In addition, a point (that is, a point obtained when the auto answer is given) acquired (determined) in step S66 in this case is lower than a point obtained when, for example, the option selected by the player B (that is, an answer of the player B) is incorrect. Further, when it is determined that the interaction between the player A and the player B is not executed a predetermined number of times in step S68 in this case, the step returns to step S61 and processing is repeated assuming that the player A is a question giver and the player B is a responder as described with reference to above step S58.

Figure 27:
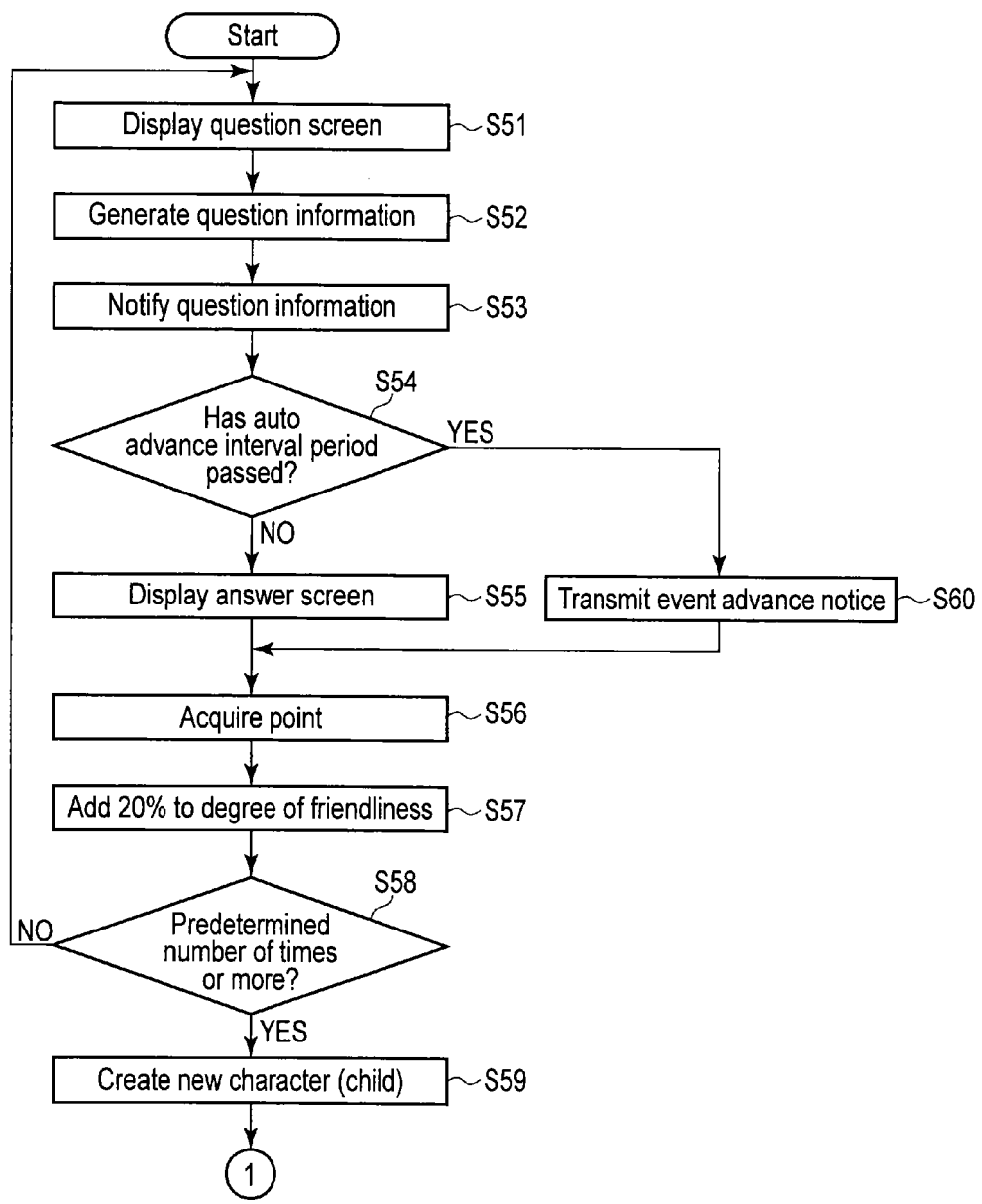
FIG. 27 is a flowchart illustrating processing of the game control device 50 when an event is started according to the present embodiment.
Figure 28:
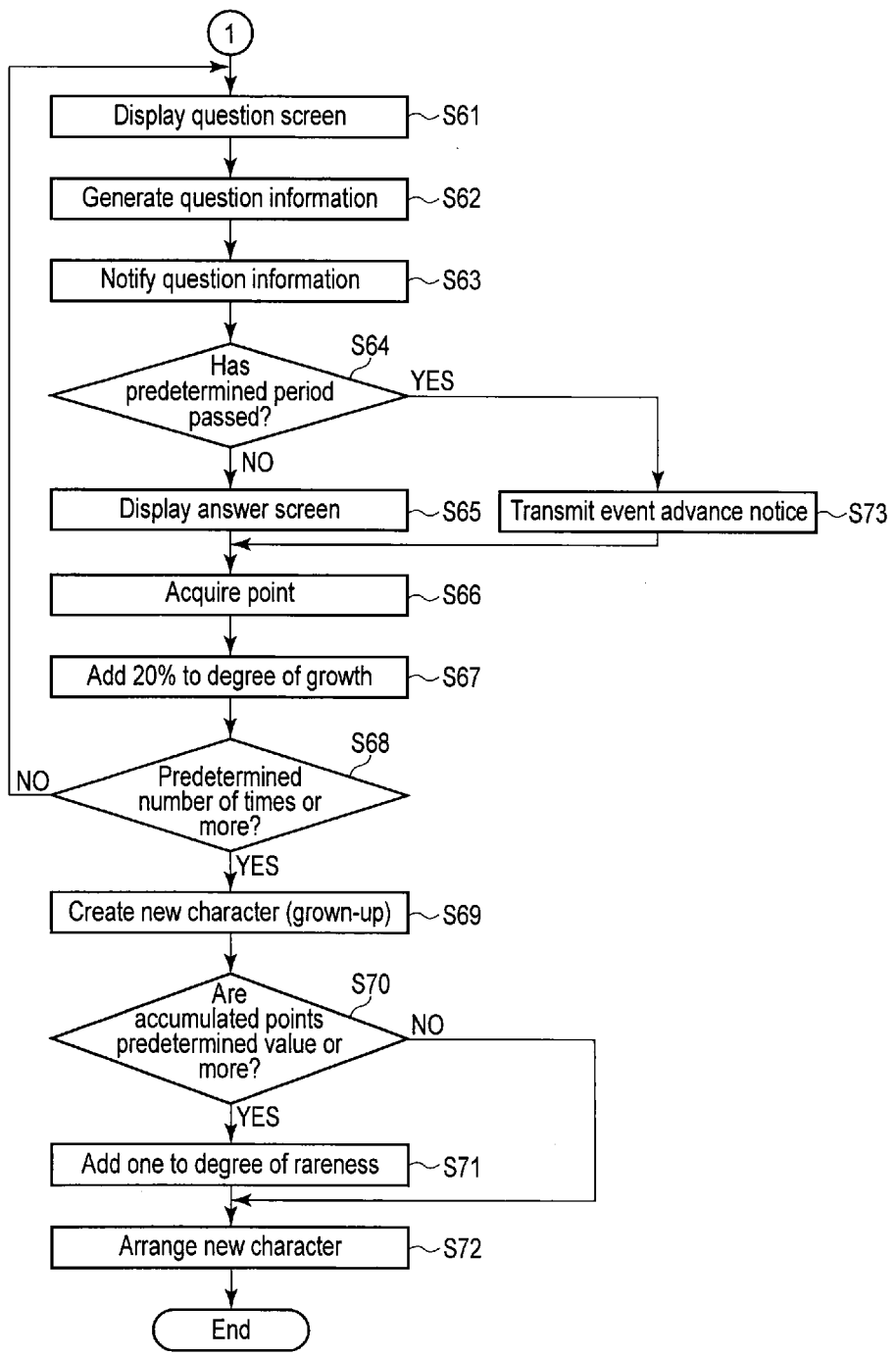
FIG. 28 is a flowchart illustrating processing of the game control device 50 when an event is started according to the present embodiment.

In addition, although not illustrated in FIGS. 27 and 28, when a command to display the above quest list screen on the communication terminals 21 and 22 is given, (information indicating) an auto advance interval period until an auto answer is given is displayed.

Further, although the processing in steps S51 to S73 in FIGS. 27 and 28 is executed, for example, a configuration may be employed where the processing in steps S61 to S69 is not executed. In this case, a new character needs to be created after the interaction between the player A and the player B is executed a predetermined number of times, and the new character only needs to be arranged in the respective virtual spaces of the player A and the player B.

As described above, in the present embodiment, according to a configuration where, when, after question information related to the virtual space of the player A is transmitted to the communication terminal 22 used by the player B, answer information to the question information is not received from the communication terminal 22 in the auto advance interval period, an event advance notice is transmitted to the communication terminal 21 and an interaction (an interaction including transmission of question information related to the virtual space of the player B to the communication terminal 21 and reception of answer information to the question information from the communication terminal 21) executed after an interaction including transmission of the question information and transmission of the event advance notice is skipped, even when the player B does not give an answer in a state where, for example, the player B (a player of the other party associated in the event) does not play a game for a long period of time, it is possible to advance an event as the auto advance interval period passes.

Similarly, in the present embodiment, according to a configuration where, when, after question information related to the virtual space of the player B is transmitted to the communication terminal 21 used by the player A, answer information to the question information is not received from the communication terminal 21 in the auto advance interval period, an event advance notice is transmitted to the communication terminal 22 and an interaction (an interaction including transmission of question information related to the virtual space of the player A to the communication terminal 22 and reception of answer information to the question information from the communication terminal 22) executed after an interaction including transmission of the question information and transmission of the event advance notice is skipped, even when the player A does not give an answer in a state where, for example, the player A does not play a game for a long period of time, it is possible to advance an event as the auto advance interval period passes.

In addition, by employing a configuration where an event advance notice is transmitted not only when the player A and the player B do not give answers but also when the player A and the player B do not give questions in the auto advance interval, it is possible to automatically advance an event even when, for example, the player A and the player B do not perform an operation at all.

Further, in the present embodiment, a point to be acquired becomes low when an answer is not given in the auto advance interval period, so that, by displaying the auto advance interval period on the communication terminals 21 and 22, it is possible to encourage players to check the start of an event and increase the frequency of playing a game.

In addition, the present invention is by no means limited to the above embodiments, and components can be modified and embodied in a range which does not deviate from the gist of the present invention at a stage of implementation. Further, various inventions can be made by adequate combinations of a plurality of components displayed in the above embodiments. For example, some components may be removed from all components disclosed in the embodiments. Further, the components in the different components may be adequately combined.

What is claimed is:

1. A game control device which is connected to and can perform communication with first and second communication terminals used by first and second players, and which provides to the first communication terminal a first virtual space in which a character of the first player exists and provides to the second communication terminal a second virtual space in which a character of the second player exists, the game control device comprising:

a storage unit which stores a parameter of the character of the first player and a parameter of the character of the second player;

an event starting unit which starts an event which associates the character of the first player and the character of the second player;

a first transmitting unit which, when the event is started, transmits first question information related to the first virtual space, to the second communication terminal;

a first receiving unit which receives first answer information to the first question information, from the second communication terminal;

a second transmitting unit which, when the first answer information is received, transmits second question information related to the second virtual space, to the first communication terminal;

a second receiving unit which receives second answer information to the second question information, from the first communication terminal;

an event managing unit which repeatedly executes alternately a first interaction including the transmission of the first question information and the reception of the first answer information and a second interaction including the transmission of the second question information and the reception of the second answer information;

a character creating unit which, when a number of times of the repeatedly executed first and second interactions reaches a predetermined value, creates a new character based on the parameter of the character of the first player and the parameter of the character of the second player stored in the storage unit; and an arranging unit which arranges the created new character in the first and second virtual spaces, wherein the character creating unit changes a parameter of the new character based on the first answer information received by the first receiving unit and the second answer information received by the second receiving unit.

2. The game control device according to claim 1, wherein:

the first question information includes a plurality of options related to the first virtual space;

the first answer information includes an option selected by the second player from the options included in the first question information;

the second question information includes a plurality of options related to the second virtual space; and the second answer information includes an option selected by the first player from the options included in the second question information.

3. The game control device according to claim 1, further comprising a third receiving unit which receives from the first communication terminal a command of the first player to display the second virtual space on the first communication terminal, and receives from the second communication terminal a command of the second player to display the first virtual space on the second communication terminal, wherein, when the command of the first player or the command of the second player is received by the third receiving unit, the event starting unit starts the event.

4. The game control device according to claim 1, wherein, when the character of the second player which exists in the second virtual space is specified by the first player through the first communication terminal or the character of the first player which exists in the first virtual space is specified by the second player through the second communication terminal, the event starting unit starts the event.

5. The game control device according to claim 1, further comprising a canceling unit which, after the event is started, cancels the association between the character of the first player and the character of the second player in the event according to a command of the first player through the first communication terminal or a command of the second player through the second communication terminal.

6. The game control device according to claim 1, wherein the first and second players are players registered in advance.

7. A game control device which is connected to and can perform communication with first and second communication terminals used by first and second players, and which provides to the first communication terminal a first virtual space in which a character of the first player exists and provides to the second communication terminal a second virtual space in which a character of the second player exists, the game control device comprising:

a storage unit which stores a parameter of the character of the first player and a parameter of the character of the second player;

an event starting unit which starts an event which associates the character of the first player and the character of the second player;

a first transmitting unit which, when the event is started, transmits first question information related to the first virtual space, to the second communication terminal;

a first receiving unit which receives first answer information to the first question information, from the second communication terminal;

a second transmitting unit which, when the first answer information is received, transmits second question information related to the second virtual space, to the first communication terminal;

a second receiving unit which receives second answer information to the second question information, from the first communication terminal;

a notifying unit which, when the first answer information is not received from the second communication terminal within a predetermined period after the first question information is transmitted to the second communication terminal, transmits an event advance notice for notifying that the started event is advanced, to the first communication terminal;

an event managing unit which repeatedly executes alternately a first interaction including the transmission of the first question information and the reception of the first answer information, a second interaction including the transmission of the second question information and the reception of the second answer information, and a third interaction including the transmission of the first question information and the transmission of the event advance notice to the first communication terminal;

a character creating unit which, when a number of times of the repeatedly executed first to third interactions reaches a predetermined value, creates a new character based on the parameter of the character of the first player and the parameter of the character of the second player stored in the storage unit; and an arranging unit which arranges the created new character in the first and second virtual spaces, wherein:

the event managing unit executes the second interaction when the first interaction is executed, executes the first or third interaction when the second interaction is executed, and executes the first or third interaction when the third interaction is executed; and the character creating unit changes a parameter of the new character based on the first answer information received by the first receiving unit and the second answer information received by the second receiving unit.

8. The game control device according to claim 7, further comprising a notifying unit which, when the second answer information is not received from the first communication terminal within a predetermined period after the second question information is transmitted to the first communication terminal, transmits an event advance notice for notifying that the started event is advanced, to the second communication terminal, wherein the event managing unit repeatedly executes the first to third interactions and a fourth interaction including the transmission of the second question information and the transmission of the event advance notice to the second communication terminal, and executes the second or fourth interaction when the first interaction is executed, executes the first or third interaction when the second interaction is executed, executes the first or third interaction when the third interaction is executed and executes the second or fourth interaction when the fourth interaction is executed.

9. The game control device according to claim 7, further comprising a display unit which displays period information which indicates the predetermined period on the first and second communication terminals.

10. A non-transitory computer-readable storage medium which stores a program to be executed by a processor of a computer in a game control device which is connected to and can perform communication with first and second communication terminals used by first and second players, and which provides to the first communication terminal a first virtual space in which a character of the first player exists and provides to the second communication terminal a second virtual space in which a character of the second player exists, and which is formed with a storage device which comprises a storage unit which stores a parameter of the character of the first player and a parameter of the character of the second player and the computer which uses the storage device, wherein the program comprises:

a first program code which causes the processor to execute processing of starting an event which associates the character of the first player and the character of the second player;

a second program code which causes the processor to execute processing of, when the event is started, transmitting first question information related to the first virtual space, to the second communication terminal;

a third program code which causes the processor to execute processing of receiving first answer information to the first question information, from the second communication terminal;

a fourth program code which causes the processor to execute processing of, when the first answer information is received, transmitting second question information related to the second virtual space, to the first communication terminal;

a fifth program code which causes the processor to execute processing of receiving second answer information to the second question information, from the first communication terminal;

a sixth program code which causes the processor to execute processing of repeatedly executing alternately a first interaction including the transmission of the first question information and the reception of the first answer information and a second interaction including the transmission of the second question information and the reception of the second answer information;

a seventh program code which causes the processor to execute processing of, when a number of times of the repeatedly executed first and second interactions reaches a predetermined value, creating a new character based on the parameter of the character of the first player and the parameter of the character of the second player stored in the storage unit; and an eighth program code which causes the processor to execute processing of arranging the created new character in the first and second virtual spaces, wherein, in the processing of creating the character, a parameter of the new character is changed based on the first answer information received from the second communication terminal and the second answer information received from the first communication terminal.

11. A non-transitory computer-readable storage medium which stores a program to be executed by a processor of a computer in a game control device which is connected to and can perform communication with first and second communication terminals used by first and second players, and which provides to the first communication terminal a first virtual space in which a character of the first player exists and provides to the second communication terminal a second virtual space in which a character of the second player exists, and which is formed with a storage device which comprises a storage unit which stores a parameter of the character of the first player and a parameter of the character of the second player and the computer which uses the storage device, wherein the program comprises:

a first program code which causes the processor to execute processing of starting an event which associates the character of the first player and the character of the second player;

a second program code which causes the processor to execute processing of, when the event is started, transmitting first question information related to the first virtual space, to the second communication terminal;

a third program code which causes the processor to execute processing of receiving first answer information to the first question information, from the second communication terminal;

a fourth program code which causes the processor to execute processing of, when the first answer information is received, transmitting second question information related to the second virtual space, to the first communication terminal;

a fifth program code which causes the processor to execute processing of receiving second answer information to the second question information, from the first communication terminal;

a sixth program code which causes the processor to execute processing of, when the first answer information is not received from the second communication terminal within a predetermined period after the first question information is transmitted to the second communication terminal, transmitting an event advance notice for notifying that the started event is advanced, to the first communication terminal;

a seventh program code which causes the processor to execute processing of repeatedly executing alternately a first interaction including the transmission of the first question information and the reception of the first answer information, a second interaction including the transmission of the second question information and the reception of the second answer information, and a third interaction including the transmission of the first question information and the transmission of the event advance notice to the first communication terminal;

an eighth program code which causes the processor to execute processing of, when a number of times of the repeatedly executed first to third interactions reaches a predetermined value, creating a new character based on the parameter of the character of the first player and the parameter of the character of the second player stored in the storage unit; and a ninth program code which causes the processor to execute processing of arranging the created new character in the first and second virtual spaces, wherein, in the repeatedly executed processing, the processor executes the second interaction when the first interaction is executed, executes the first or third interaction when the second interaction is executed, and executes the first or third interaction when the third interaction is executed; and in the processing of creating the character, changes a parameter of the new character based on the first answer information received from the second communication terminal and the second answer information received from the first communication terminal.

12. The storage medium according to claim 11, wherein: the program further comprises a tenth program code which causes the processor to execute processing of, when the second answer information is not received from the first communication terminal within a predetermined period after the second question information is transmitted to the first communication terminal, transmitting an event advance notice for notifying that the started event is advanced, to the second communication terminal; and in the repeatedly executed processing, the processor repeatedly executes the first to third interactions and a fourth interaction including the transmission of the second question information and the transmission of the event advance notice to the second communication terminal, and executes the second or fourth interaction when the first interaction is executed, executes the first or third interaction when the second interaction is executed, executes the first or third interaction when the third interaction is executed and executes the second or fourth interaction when the fourth interaction is executed.

13. The storage medium according to claim 11, wherein the program further comprises a program code which causes the processor to execute processing of displaying period information which indicates the predetermined period on the first and second communication terminals.

* * * * *